United States Patent
Uehara

(10) Patent No.: US 7,215,240 B2
(45) Date of Patent: May 8, 2007

(54) NONCONTACTING SHORT-RANGE COMMUNICATION DEVICE FOR SLIDE DOOR

(75) Inventor: Takehiko Uehara, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 218 days.

(21) Appl. No.: 10/531,373

(22) PCT Filed: Sep. 29, 2003

(86) PCT No.: PCT/JP03/12415

§ 371 (c)(1),
(2), (4) Date: Apr. 15, 2005

(87) PCT Pub. No.: WO2004/035355

PCT Pub. Date: Apr. 29, 2004

(65) Prior Publication Data

US 2006/0052054 A1   Mar. 9, 2006

(30) Foreign Application Priority Data

Oct. 15, 2002 (JP) ............................ 2002-300345

(51) Int. Cl.
*B60Q 1/00* (2006.01)

(52) U.S. Cl. .............................. 340/425.5; 340/426.24; 340/426.28; 340/941; 340/5.1; 340/5.2

(58) Field of Classification Search ............. 340/425.5, 340/426.22, 426.24, 539.1, 933, 941, 5.1, 340/5.2, 5.72, 10.1, 426.28
See application file for complete search history.

(56) References Cited

U.S. PATENT DOCUMENTS

| | | | | |
|---|---|---|---|---|
| 5,140,316 A | * | 8/1992 | DeLand et al. | 340/825.89 |
| 5,239,779 A | * | 8/1993 | DeLand et al. | 49/360 |
| 5,389,920 A | * | 2/1995 | DeLand et al. | 340/825.69 |
| 5,684,470 A | * | 11/1997 | DeLand et al. | 340/825.69 |
| 6,011,320 A | * | 1/2000 | Miyamoto et al. | 307/10.2 |
| 6,229,434 B1 | * | 5/2001 | Knapp et al. | 340/310.16 |
| 6,489,883 B1 | * | 12/2002 | Iiyama et al. | 340/5.1 |
| 6,617,961 B1 | * | 9/2003 | Janssen et al. | 340/5.8 |
| 7,034,683 B2 | * | 4/2006 | Ghazarian | 340/568.1 |

FOREIGN PATENT DOCUMENTS

| | | |
|---|---|---|
| DE | 199 47 491 A1 | 4/2001 |
| JP | 2-14920 | 1/1990 |
| JP | 2003-511289 | 3/2003 |
| WO | 01/25056 A1 | 4/2001 |

* cited by examiner

*Primary Examiner*—Daryl C Pope
(74) *Attorney, Agent, or Firm*—Armstrong, Kratz, Quintos, Hanson & Brooks, LLP

(57) ABSTRACT

A noncontacting short-range communication device for a slide door for excellently performing bidirectional data communication by electromagnetic induction coupling between the side of a vehicle body and the side of the slide door is provided. Data are transmitted and received between the first communication unit 31 connected to the first antenna member 17 and the second communication unit 41 connected to the second antenna member 18 by the electromagnetic induction coupling of the first and second antenna members 17, 18. Each of the first and second communication units 31, 41 includes a microcomputer 34, 44 and a data communication circuit 33, 43 for performing semi-duplex bidirectional communication. Each of the data communication circuit 33, 43 includes: a transmitting section 33A, 43A, to which a clock pulse of the microcomputer 34, 44 is supplied, for transmitting a modulated wave obtained by on-off modulating the clock pulse as a base signal with the data having a serial communication form through the antenna member 17, 18; and a receiving section 33B, 43B for receiving and demodulating the modulated wave so as to gain the data.

10 Claims, 17 Drawing Sheets

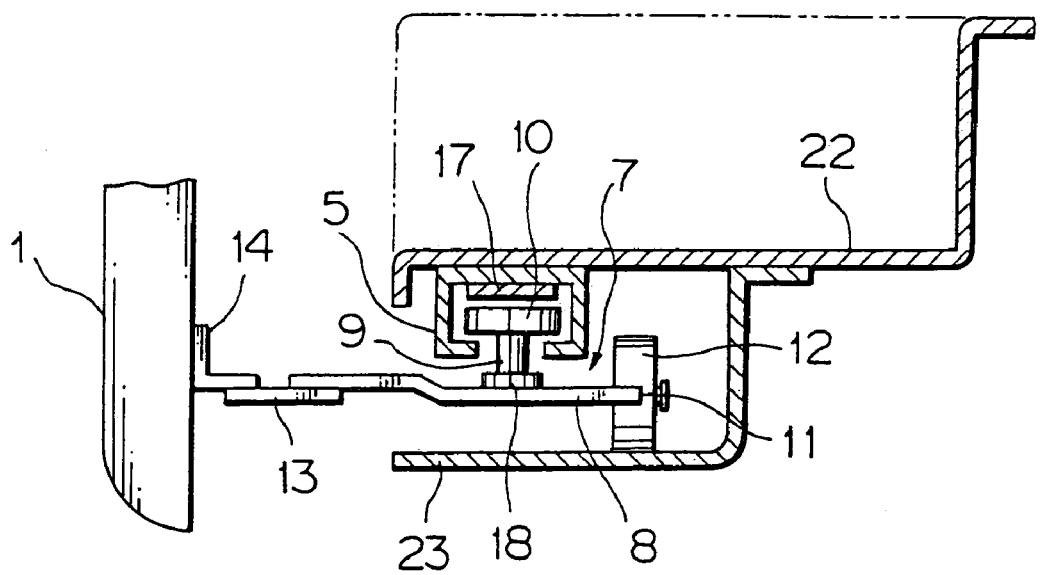
FIG. 2A
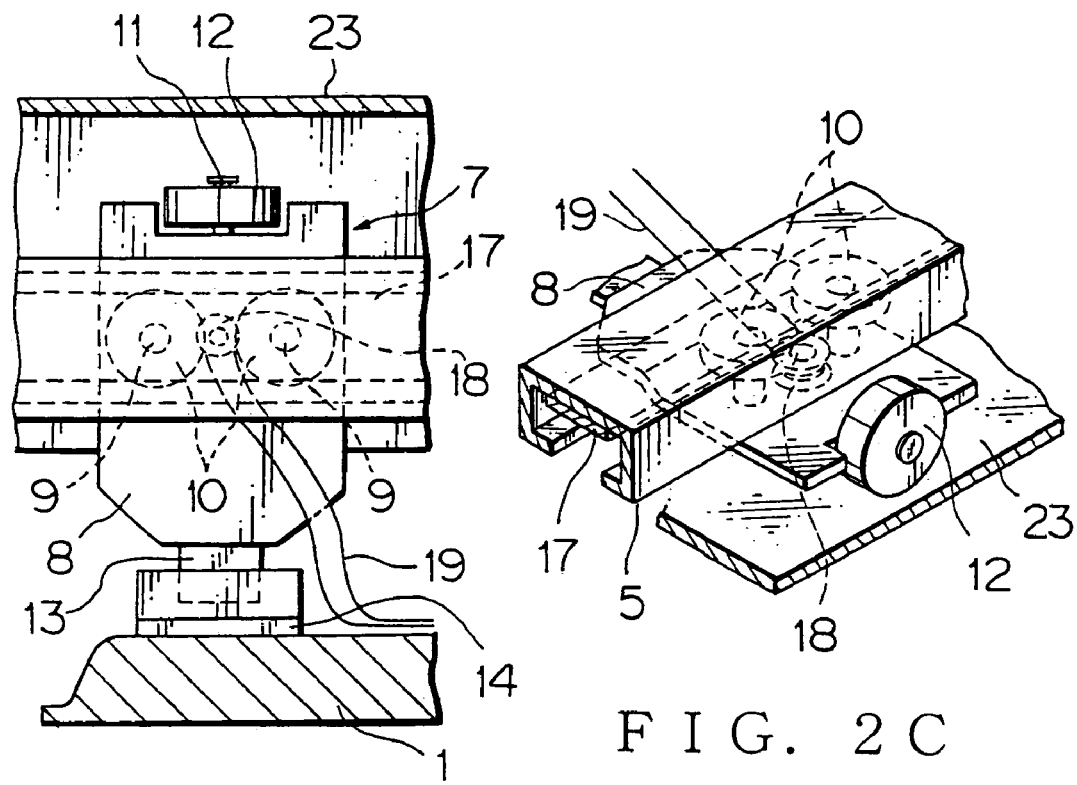
FIG. 2C
FIG. 2B

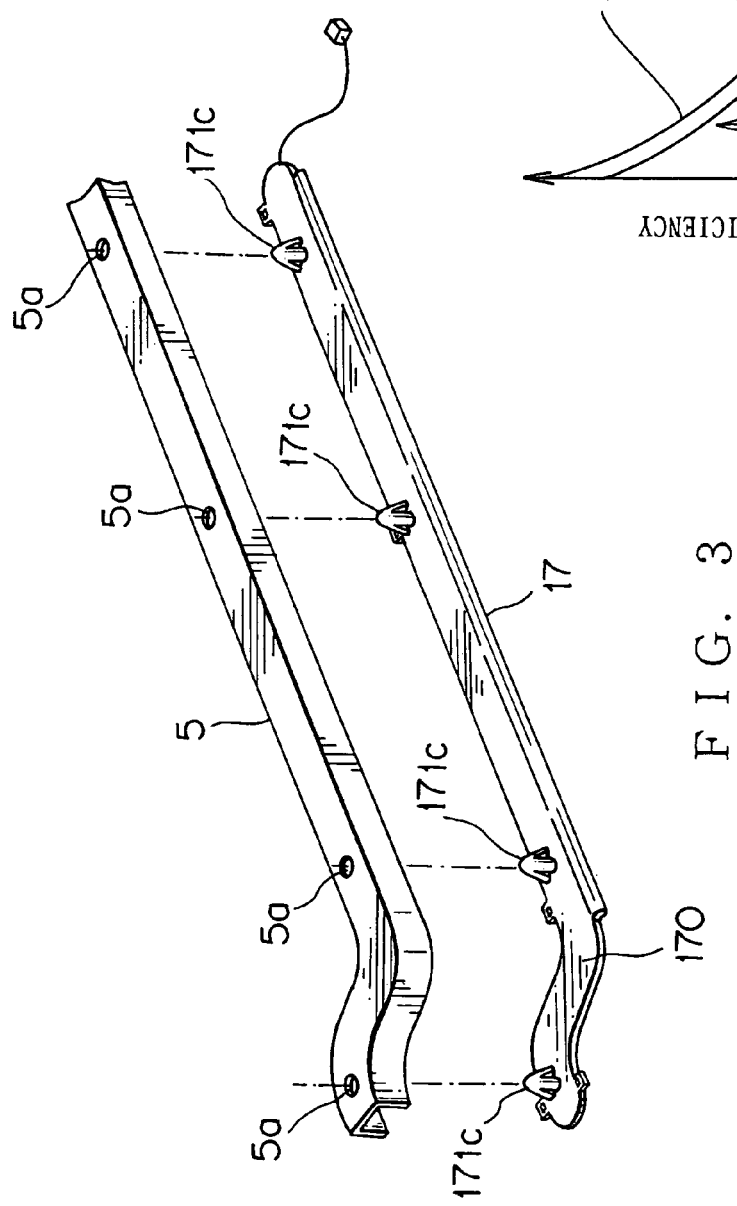

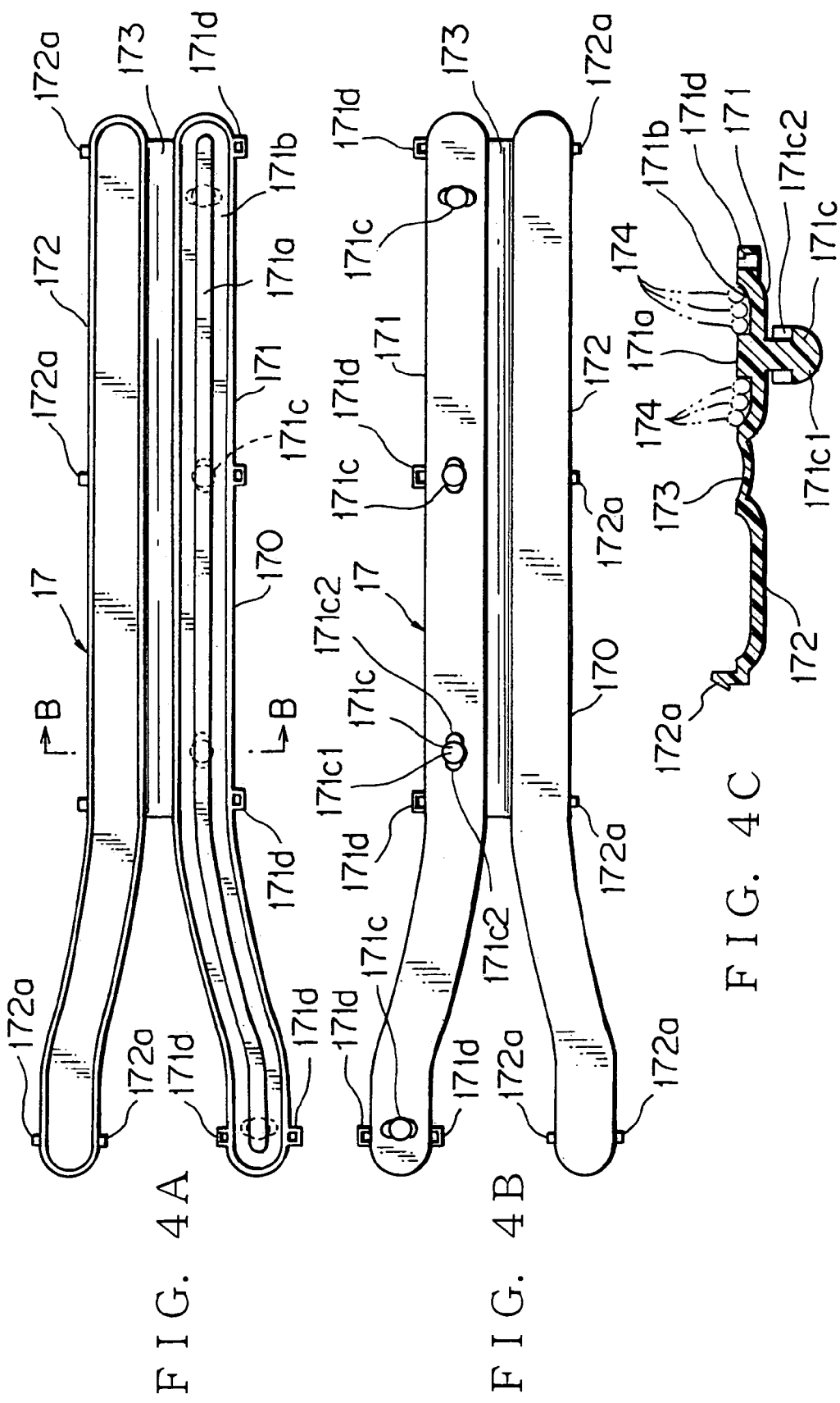

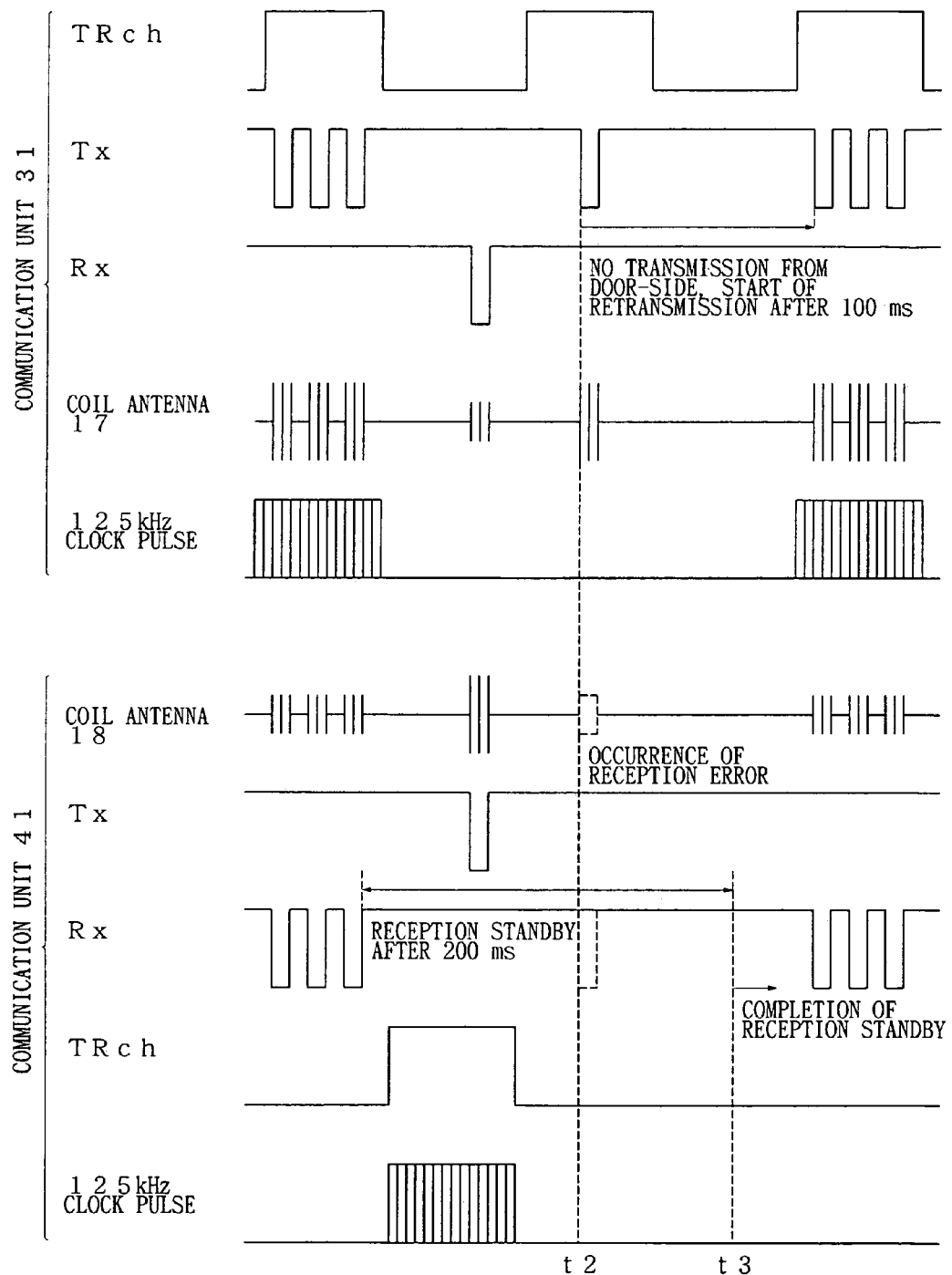
F I G. 1 4

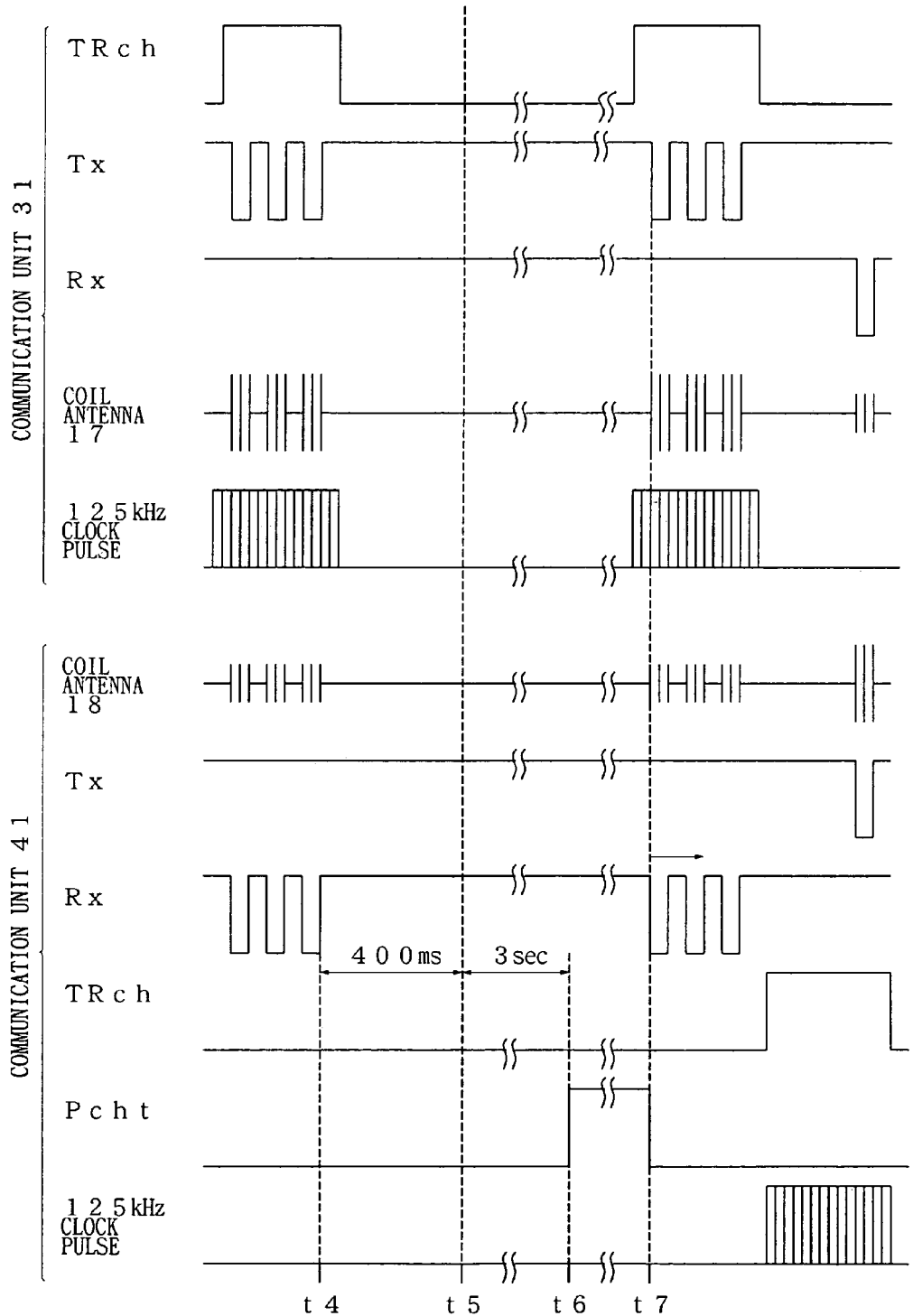
F I G. 1 5

NONCONTACTING SHORT-RANGE COMMUNICATION DEVICE FOR SLIDE DOOR

TECHNICAL FIELD

The present invention relates to a noncontacting short-range communication device for a slide door.

BACKGROUND ART

So far, as a structure for supplying electric power to each auxiliary machine such as a power window motor or a door lock unit in a slide door, which is seen in an one-box car or some passenger cars, various measures have been adopted in order to connect each auxiliary machine to a wiring harness on the side of a vehicle body (i.e. on the side of a power source) through a door wiring harness.

For example, a conventional structure for supplying electric power is a structure, in which a signal is transmitted from the side of a vehicle body to each auxiliary machine on the side of the slide door by using electric wires that moves as the slide door is slid. However, this structure has a problem that the electric wires are bent as the slide door is repeatedly opened and closed causing the electric wires being broken. Moreover, the electric wires are seen when the slide door is opened or closed causing damage to the outside appearance.

Another conventional structure for supplying electric power is disclosed in Japanese Utility Model Laid-Open No. H4-124555. In this structure, the side of a vehicle body, which has a slide door slidable back and forth, is provided with a first power supply terminal that connects to the side of a battery, while the side of the slide door is provided with a second power supply terminal that connects to the side of a door control device, wherein the first power supply terminal is provided with a movable terminal surrounded by an insulating member, the movable terminal being separable from the first power supply terminal, wherein the movable terminal is pressed and held by an end of the second power supply terminal when the slide door is closed, thereby connecting the first and second power supply terminals.

However, the structure described above has a drawback in points that the current-carrying is performed only when the slide door is closed and that when the door is opened even a little the action of an auxiliary machine such as opening or closing of a power window is not performed, and that it is impossible to take a measure such as preventing being caught from occurring. Further, since the structure described above is a double-contacts structure, in which the first and second power supply terminals are connected to each other through the movable terminal for dust-proofing and water-proofing, therefore causing increase in contact resistance and deterioration in reliability of electric connection.

For the purpose of solving the above problem, there has been proposed an idea for employing a technique, in which the electric power and the data are transmitted in a noncontacting manner utilizing electromagnetic coupling. An example of such a technique is a noncontacting data-carrier system as disclosed in Japanese Patent Application Laid-Open No. H8-316895. In such a noncontacting communication system, mainly, a communication is performed between a base IC that carries out reading and writing of the data and a transponder IC that stores the data in advance. Since the transponder IC do not have a power source, the base IC generates a large resonance output by electromagnetic induction so that the supply of the electric power and transmitting of the data are simultaneously performed.

However, in the nonocontacting communication system described above, since the large resonance output causes a noise release to surrounding equipment, therefore it is difficult to perform the communication by electromagnetic coupling in such a manner in an area in which surrounding equipment of a motor vehicle and so on stands close to one another.

Further, in the electromagnetic induction communication, the resonance output of the receiving-side is supplied to the transmitting-side, then the output is impedance-modulated synchronously with serial data, so that a change in current on the receiving-side is outputted serially. Therefore, the action becomes passive, causing a difficulty in application to various communication modes, because important is an action of the receiving-side, the action being synchronous with an event output of the transmitting-side.

In order to attain bidirectional communication between two communication units as a noncontacting communication system, in which electromagnetic coupling appropriate for mounting on a vehicle is utilized, it can be considered that communication of only data is performed by using electromagnetic coupling, while power is separately supplied to each communication unit not by using electromagnetic coupling. In such a case, magnetic field can be reduced minimal necessary for transmitting and receiving only the data, therefore the noise can be prevented from being released to the outside, thereby attaining data communication in a noncontacting manner in a limited area.

An example of the noncontacting communication system described above has been proposed by the present applicant in Japanese Patent Application No. 2002-143384 titled as "noncontacting short-range communication device for slide door". This communication device includes a rail provided in a vehicle body; a slide part provided in a slide door sliding being guided by the rail; a first antenna member attached to the rail in the longitudinal direction of the rail; a second antenna member provided in the slide part so as to face to the first antenna member closely; a first communication unit provided on the side of the vehicle body being connected to the first antenna member; and a second communication unit having the same constitution as that of the first communication unit, the second communication unit being provided on the side of the slide door being connected to the second antenna member, wherein the first and second communication units transmit or receive data by electromagnetic induction coupling between the first and second antenna members.

In the noncontacting short-range communication device for a slide door, required is a circuit construction that excellently performs a bidirectional data communication using electromagnetic coupling.

Further, in the bidirectional data communication using electromagnetic coupling, if a constant communication in a vehicle is taken into consideration, it is necessary to have a security function as to the communication data because of a possible malfunction due to external magnetic field. As such a security function, for example, considered is a manner, in which the same ID code is recognized between the bidirectional communication units (such as ECU of the vehicle) so that the permission of driving is given.

However, for example, when one ECU out of the pair of the ECU is damaged, since the pair of the ECU in the bidirection stores the same ID code initially set in advance, therefore it is necessary to switch the other normal ECU simultaneously, causing deterioration in maintenance and increase in the repair cost.

It is therefore an objective of the present invention to solve the above problems and to provide a noncontacting short-range communication device for a slide door, which includes a circuit construction for excellently performing the bidirectional data communication between the side of a vehicle body and the side of the slide door using electromagnetic induction coupling.

It is another objective of the present invention to provide a noncontacting short-range communication device for a slide door, which includes a circuit construction for excellently performing the bidirectional data communication between the side of a vehicle body and the side of the slide door using electromagnetic induction coupling and has an excellent maintenance and inexpensive repair cost.

DISCLOSURE OF THE INVENTION

In order to attain the above objective, the present invention defined in claim 1 is a noncontacting short-range communication device for a slide door including:

a rail provided in a vehicle body;

a slide part provided in a slide door sliding being guided by the rail;

a first antenna member attached to the rail in the longitudinal direction of the rail;

a second antenna member provided in the slide part so as to face to the first antenna member closely;

a first communication unit provided on the side of the vehicle body being connected to the first antenna member; and a second communication unit having the same constitution as that of the first communication unit, the second communication unit being provided on the side of the slide door being connected to the second antenna member, wherein the first and second communication units transmit or receive data by electromagnetic induction coupling between the first and second antenna members, wherein each of the first and second communication units is supplied with electric power from a battery and includes a microcomputer and a data communication circuit controlled by the microcomputer, the data communication circuit performing semi-duplex bidirectional communication, wherein the data communication circuit includes:

a transmitting section, to which a clock pulse of the microcomputer is supplied, for transmitting a modulated wave obtained by on-off modulating the clock pulse as a base signal with the data having a serial communication form through the antenna member; and a receiving section for receiving and demodulating the modulated wave through the antenna member so as to gain the data having a serial communication form.

According to the invention defined in claim 1, the noncontacting short-range communication device for a slide door includes:

a rail provided in a vehicle body;

a slide part provided in a slide door sliding being guided by the rail;

a first antenna member attached to the rail in the longitudinal direction of the rail;

a second antenna member provided in the slide part so as to face to the first antenna member closely;

a first communication unit provided on the side of the vehicle body being connected to the first antenna member; and a second communication unit having the same constitution as that of the first communication unit, the second communication unit being provided on the side of the slide door being connected to the second antenna member, wherein the first and second communication units transmit or receive data by electromagnetic induction coupling between the first and second antenna members, wherein each of the first and second communication units is supplied with electric power from a battery and includes a microcomputer and a data communication circuit controlled by the microcomputer, the data communication circuit performing semi-duplex bidirectional communication, wherein the data communication circuit includes:

a transmitting section, to which a clock pulse of the microcomputer is supplied, for transmitting a modulated wave obtained by on-off modulating the clock pulse as a base signal with the data having a serial communication form through the antenna member; and a receiving section for receiving and demodulating the modulated wave through the antenna member so as to gain the data having a serial communication form.

Therefore, transmitting and receiving of the noncontacting data between the sides of the vehicle body and slide door by cheap and simple electromagnetic coupling becomes always possible in a semi-duplex bidirectional communication form. Moreover, since the communication can be attained by using weak outputs, noises can be prevented from being released to the outside and necessary data can be transmitted and received without any interference with the other communication. Furthermore, upon mounting of the device of the present invention, there is no anxiety that the bending of the electric wires might cause the breaking of the electric wires. There is no anxiety that water or dust might cause poor electrical quality, thereby improving the reliability.

In order to attain the above objective, the present invention defined in claim 2 is the device according to claim 1, wherein at least one of the first and second communication units further includes an impedance-adjusting transformer connected between the antenna member and the transmitting and receiving sections.

According to the invention defined in claim 2, at least one of the first and second communication units further includes an impedance-adjusting transformer connected between the antenna member and the transmitting and receiving sections. Therefore, the reception efficiency can be improved and the reception efficiency of the two communication units can be balanced.

In order to attain the above objective, the present invention defined in claim 3 is the device according to claim 1 or 2, wherein the transmitting section includes:

a modulation circuit, to which a clock pulse of the microcomputer is supplied, for on-off modulating the clock pulse as a base signal with the data having a serial communication form;

a waveform-shaping filter for waveform-shaping a modulated wave from the modulation circuit; and a transmitting driver, to which an output from the waveform-shaping filter is supplied, for driving the antenna member, wherein the receiving section includes:

a tuning circuit connected to the antenna member, for tuning to a clock pulse frequency of the microcomputer; and a demodulation circuit for demodulating an output from the tuning circuit so as to gain the data.

According to the invention defined in claim 3, the transmitting section includes:

a modulation circuit, to which a clock pulse of the microcomputer is supplied, for on-off modulating the clock pulse as a base signal with the data having a serial communication form;

a waveform-shaping filter for waveform-shaping a modulated wave from the modulation circuit; and a transmitting driver, to which an output from the waveform-shaping filter is supplied, for driving the antenna member, wherein the receiving section includes:

a tuning circuit connected to the antenna member, for tuning to a clock pulse frequency of the microcomputer; and a demodulation circuit for demodulating an output from the tuning circuit so as to gain the data.

Therefore, transmitting and receiving of the data can be securely performed with low cost.

In order to attain the above objective, the present invention defined in claim 4 is the device according to claim 3, wherein the transmitting section further includes a control section for rendering the data communication circuit into a low electric power consumption mode on the basis of control by the microcomputer.

According to the invention defined in claim 4, the transmitting section further includes a control section for rendering the data communication circuit into a low electric power consumption mode on the basis of control by the microcomputer. Therefore, the standby can be possible with low electric power consumption.

In order to attain the above objective, the present invention defined in claim 5 is the device according to claim 3, wherein the demodulation circuit includes:

a detection circuit for detecting an output from the tuning circuit; and a first comparator for comparing a detected output from the detection circuit with a first reference level so as to gain the data.

According to the invention defined in claim 5, the demodulation circuit includes:

a detection circuit for detecting an output from the tuning circuit; and a first comparator for comparing a detected output from the detection circuit with a first reference level so as to gain the data. Therefore, the on-off modulated data can be securely demodulated.

In order to attain the above objective, the present invention defined in claim 6 is a noncontacting short-range communication device for a slide door including:

a rail provided in a vehicle body;

a slide part provided in a slide door sliding being guided by the rail;

a first antenna member attached to the rail in the longitudinal direction of the rail;

a second antenna member provided in the slide part so as to face to the first antenna member closely;

a first communication unit provided on the side of the vehicle body being connected to the first antenna member; and a second communication unit having the same constitution as that of the first communication unit, the second communication unit being provided on the side of the slide door being connected to the second antenna member, wherein the first and second communication units transmit or receive data by electromagnetic induction coupling between the first and second antenna members, wherein each of the first and second communication units is supplied with electric power from a battery and includes a microcomputer and a data communication circuit controlled by the microcomputer, the data communication circuit performing semi-duplex bidirectional communication, wherein the data communication circuit includes:

a transmitting section, to which a clock pulse of the microcomputer is supplied, for transmitting a modulated wave obtained by on-off modulating the clock pulse as a base signal with the data having a serial communication form and a security ID code of the semi-duplex bidirectional communication through the antenna member; and a receiving section for receiving and demodulating the modulated wave through the antenna member so as to gain the data having a serial communication form and the ID code, wherein the microcomputer includes:

storing means for storing the ID code in advance; and collating means for collating the ID code stored in the storing means with the ID code gained by the receiving section.

According to the invention defined in claim 6, the noncontacting short-range communication device for a slide door includes:

a rail provided in a vehicle body;

a slide part provided in a slide door sliding being guided by the rail;

a first antenna member attached to the rail in the longitudinal direction of the rail;

a second antenna member provided in the slide part so as to face to the first antenna member closely;

a first communication unit provided on the side of the vehicle body being connected to the first antenna member; and a second communication unit having the same constitution as that of the first communication unit, the second communication unit being provided on the side of the slide door being connected to the second antenna member, wherein the first and second communication units transmit or receive data by electromagnetic induction coupling between the first and second antenna members, wherein each of the first and second communication units is supplied with electric power from a battery and includes a microcomputer and a data communication circuit controlled by the microcomputer, the data communication circuit performing semi-duplex bidirectional communication, wherein the data communication circuit includes:

a transmitting section, to which a clock pulse of the microcomputer is supplied, for transmitting a modulated wave obtained by on-off modulating the clock pulse as a base signal with the data having a serial communication form and a security ID code of the semi-duplex bidirectional communication through the antenna member; and a receiving section for receiving and demodulating the modulated wave through the antenna member so as to gain the data having a serial communication form and the ID code, wherein the microcomputer includes:

storing means for storing the ID code in advance; and collating means for collating the ID code stored in the storing means with the ID code gained by the receiving section.

Therefore, the security function can act with respect to the transmitting and receiving of the data, thereby avoiding malfunction due to the external magnetic field and so on.

In order to attain the above objective, the present invention defined in claim 7 is the device according to claim 6, wherein at least one of the first and second communication units further includes an impedance-adjusting transformer connected between the antenna member and the transmitting and receiving sections.

According to the invention defined in claim 7, at least one of the first and second communication units further includes an impedance-adjusting transformer connected between the antenna member and the transmitting and receiving sections. Therefore, the reception efficiency can be improved and the reception efficiency of the two communication units can be balanced.

In order to attain the above objective, the present invention defined in claim 8 is the device according to claim 6 or 7, wherein the transmitting section includes:

a modulation circuit, to which a clock pulse of the microcomputer is supplied, for on-off modulating the clock pulse as a base signal with the data having a serial communication form and the security ID code of the semi-duplex bidirectional communication;

a waveform-shaping filter for waveform-shaping a modulated wave from the modulation circuit; and a transmitting driver, to which an output from the waveform-shaping filter is supplied, for driving the antenna member, wherein the receiving section includes:

a tuning circuit connected to the antenna member, for tuning to a clock pulse frequency of the microcomputer; and a demodulation circuit for demodulating an output from the tuning circuit so as to gain the ID code and the data.

According to the invention defined in claim 8, the transmitting section includes:

a modulation circuit, to which a clock pulse of the microcomputer is supplied, for on-off modulating the clock pulse as a base signal with the data having a serial communication form and the security ID code of the semi-duplex bidirectional communication;

a waveform-shaping filter for waveform-shaping a modulated wave from the modulation circuit; and a transmitting driver, to which an output from the waveform-shaping filter is supplied, for driving the antenna member, wherein the receiving section includes:

a tuning circuit connected to the antenna member, for tuning to a clock pulse frequency of the microcomputer; and a demodulation circuit for demodulating an output from the tuning circuit so as to gain the ID code and the data.

Therefore, the clock pulse of the microcomputer is used as the base signal in the modulation circuit and there is no need to have a separate circuit for generating the base signal. Therefore, transmitting and receiving of the data can be securely performed with low cost.

In order to attain the above objective, the present invention defined in claim 9 is the device according to claim 8, wherein the transmitting section further includes a control section for rendering the data communication circuit into a low electric power consumption mode on the basis of control by the microcomputer.

According to the invention defined in claim 9, the transmitting section further includes a control section for rendering the data communication circuit into a low electric power consumption mode on the basis of control by the microcomputer. Therefore, the standby can be possible with low electric power consumption.

In order to attain the above objective, the present invention defined in claim 10 is the device according to claim 8, wherein the communication unit has a normal communication mode and an ID code-rewriting mode as operation modes thereof, wherein upon the normal communication mode, the modulation circuit is supplied with a clock pulse of the microcomputer and outputs a modulated wave obtained by on-off modulating the clock pulse as a base signal with the data having a serial communication form and the ID code, while upon the ID code-rewriting mode, the modulation circuit is supplied with a clock pulse of the microcomputer and outputs a modulated wave obtained by on-off modulating the clock pulse as a base signal only with the ID code, wherein upon the ID code-rewriting mode, a transmission output level of the transmitting driver is switched from a normal communication mode level to an ID code-rewriting mode level that is larger than the normal communication mode level according to an ID code-rewriting control signal from the microcomputer, and wherein the demodulation circuit includes:

a detection circuit for detecting an output from the tuning circuit;

a first comparator for comparing a detected output from the detection circuit with a first threshold level so as to gain the data; and a second comparator for comparing a detected output from the detection circuit with a second threshold level that is higher than the first threshold level so as to gain the ID code.

According to the invention defined in claim 10, the communication unit has a normal communication mode and an ID code-rewriting mode as operation modes thereof, upon the normal communication mode, the modulation circuit is supplied with a clock pulse of the microcomputer and outputs a modulated wave obtained by on-off modulating the clock pulse as a base signal with the data having a serial communication form and the ID code, while upon the ID code-rewriting mode, the modulation circuit is supplied with a clock pulse of the microcomputer and outputs a modulated wave obtained by on-off modulating the clock pulse as a base signal only with the ID code, upon the ID code-rewriting mode, a transmission output level of the transmitting driver is switched from a normal communication mode level to an ID code-rewriting mode level that is larger than the normal communication mode level according to an ID code-rewriting control signal from the microcomputer, and the demodulation circuit includes:

a detection circuit for detecting an output from the tuning circuit;

a first comparator for comparing a detected output from the detection circuit with a first threshold level so as to gain the data; and a second comparator for comparing a detected output from the detection circuit with a second threshold level that is higher than the first threshold level so as to gain the ID code.

Therefore, when one communication unit is broken down, there is no need to replace the other normal communication unit. Since the other normal communication unit can be subjected to the rewriting with a new ID code of the replaced communication unit, therefore the maintenance property can be improved and the repair cost can be reduced.

BRIEF DESCRIPTION OF THE DRAWINGS

FIGS. 2A–2C are a cross sectional view taken along A—A line in FIG. 1, plan view, and perspective view, respectively, each illustrating the first preferred embodiment of the noncontacting short-range communication device for a slide door according to the present invention;

FIG. 3 is a perspective view illustrating an example of the first antenna member;

FIGS. 4A–4C are a plan view, back view, and cross sectional view taken along B—B line in the plan view, respectively, each illustrating the first antenna member shown in FIG. 3;

FIG. 14 shows signal waveforms of respective sections in the communication unit upon processing for receiving error;

FIG. 15 shows signal waveforms of respective sections in the communication unit upon processing for a sleep or wake-up;

FIG. 17 is a graph showing a reception efficiency characteristic of the communication units with respect to an antenna distance between the communication units shown in FIG. 16;

BEST MODE FOR CARRING OUT THE INVENTION

In the following, the first preferred embodiment of a noncontacting short-range communication device for a slide door according to the present invention will be explained with reference to FIGS. 1–15.

Figure 1:
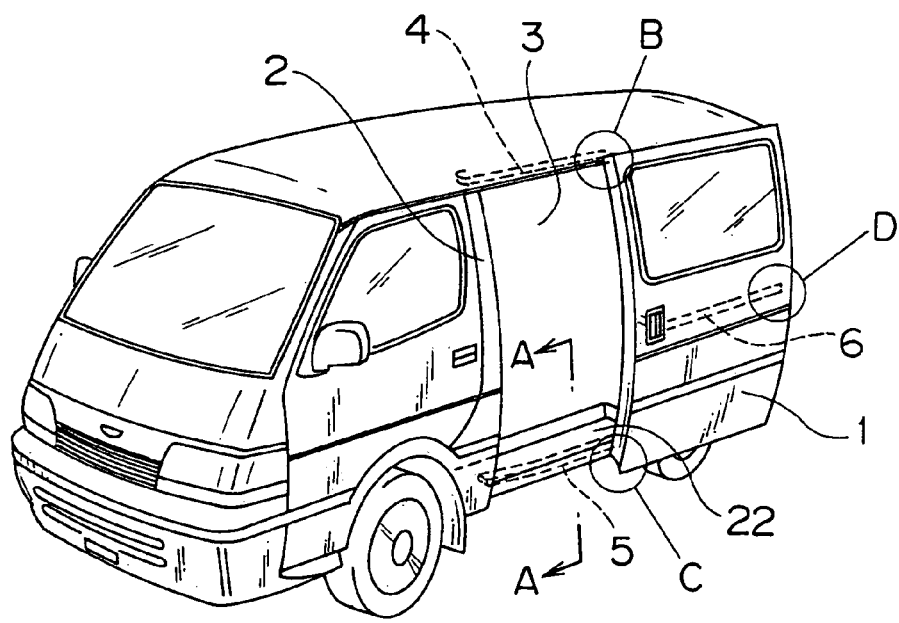
FIG. 1 is a perspective view illustrating an example of a motor vehicle, to which the noncontacting short-range communication device for a slide door according to the present invention is applied.

FIG. 1 is a perspective view illustrating an example of a motor vehicle, to which the noncontacting short-range communication device for a slide door according to the present invention is applied. In FIG. 1, an upper rail 4, lower rail 5 and center rail 6, which are disposed at an upper and lower edges of an opening 3 formed on a vehicle body 2, and at the center in the up-and-down direction of a rear side wall of the vehicle body 2, respectively, are engaged with an upper roller (not shown in the figure), lower roller 7 (see FIG. 2) and center roller (not shown in the figure), which are disposed at an upper front end B, lower front end C and central rear end D of a slide door 1, respectively, so that the slide door 1 slides along the vehicle body 2 being guided by the respective rails 4, 5, 6.

As shown in FIG. 2, the lower roller 7 functions as a slide part which slides facing to the lower rail 5, wherein horizontal rollers 10 are rotatably supported by respective vertical shafts 9 situated left and right formed on roller support member 8, a traveling roller 12 is rotatably supported by a horizontal shaft 11 formed between vertical shafts of the roller support member 8, and the roller support member 8 is pivotally attached to a support arm 13. The support arm 13 is attached to a L-shaped bracket 14 fixed to the slide door 1.

The lower rail 5 is made of grounded metal and fixed to a lower surface of a step panel 22, while the horizontal roller 10 is slidably fit to the lower rail 5. The traveling roller 12 comes in contact with a member 23 situated below the step panel 22.

A coil antenna 17 as the first antenna member is mounted at the upper inside of the lower rail 5 with fixing means such as adhesion in an electrically insulating condition. The roller support member 8 is made of grounded metal. A coil antenna 18 as the second antenna member is mounted on the roller support member 8 facing and adjacent to the coil antenna 17 with fixing means such as adhesion in an electrically insulating condition. An end of the coil antenna 18 is connected to a lead wire 19. The coil antenna 17 and coil antenna 18 are placed having a short distance such as from 5 mm to 10 mm therebetween so that the noncontacting short-range communication by electromagnetic induction coupling between them is possible.

For example, the size of the coil antenna 17 is from 20 mm to 30 mm in width and from 800 mm to 1000 mm in length, said length approximately corresponds to a stroke for which the slide door 1 slides with respect to a vehicle body.

Figure 5:
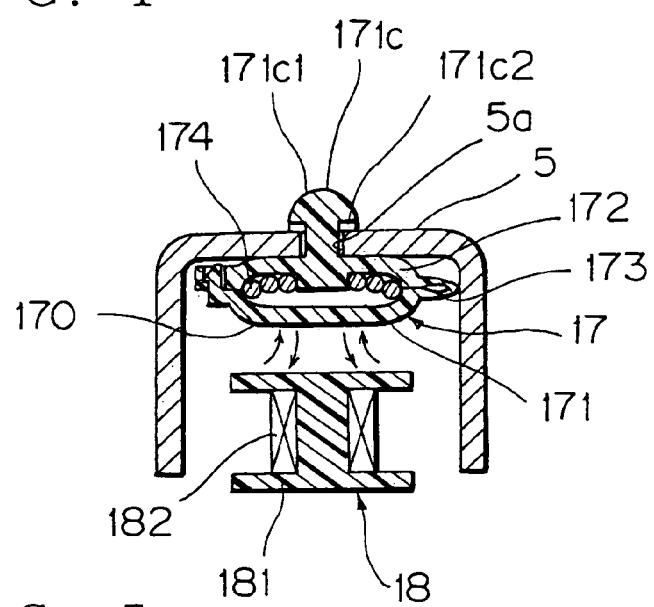
FIG. 5 is a view illustrating a state when the first antenna member shown in FIG. 3 is mounted on a lower rail.

FIGS. 3–5 show an example of the coil antenna 17. As shown in FIG. 3, engaging parts 171c as fixing means integrally formed with a long antenna protector 170 made of synthetic resin, which receives coil-shaped wire rods (explained later on) therein, are inserted into and engaged with respective mounting holes 5a formed in the lower rail 5, thereby the coil antenna 17 is fixed to the lower rail 5.

As shown in FIGS. 4A–4C, the antenna protector 170 of the coil antenna 17 has a structure, in which a protector body 171 is connected to a cover 172 having the same outer diameter as that of the protector body 171 with a hinge 173.

The protector body 171 includes: a middle partition 171a projectingly formed at the center in the longitudinal direction of the protector body 171; a groove 171b formed around the middle partition 171a for receiving coil-shaped wire rods 174; locking parts 171c formed projectingly toward the opposite side of the middle partition 171a and the groove 171b; and engaging parts 171d for engaging respective engaging claws 172a formed on the cover 172. Each locking part 171c includes a projection 171c1 and a locking claw 171c2 formed to be resilient around the projection 171c1. Each locking claw 171c2 of the locking part 171c formed at the corresponding end of the protector body 171 is formed in a direction crossing at right angles to the longitudinal direction of the protector body 171, while each locking claw 171c2 of the locking part 171c formed at an intermediate position of the protector body 171 is formed in a direction parallel with the longitudinal direction of the protector body 171.

Upon assembly of the coil antenna 17, the wire rods 174 are wound with several turns (for example, three turns) and received in the groove 171b of the protector body 171 of the antenna protector 170, then the cover 172 is applied onto the protector body 171 and the engaging claws 172a are engaged with the engaging parts 171d, thereby completing the assembly of the coil antenna 17.

FIG. 5 is a view illustrating a state when the assembled coil antenna 17 as the first antenna member is mounted on the lower rail 5. The projections 171c1 of the locking part 171c are inserted into the respective mounting holes 5a of the lower rail 5 and the locking claws 171c2 are locked to an upper surface of the lower rail 5 around the respective mounting holes 5a, thereby the assembled coil antenna 17 is mounted on the lower rail 5. At that time, each locking claw 171c2 of the locking part 171c formed at the corresponding end of the protector body 171 is formed in the direction crossing at right angles with the longitudinal direction of the protector body 171, while each locking claw 171c2 of the locking part 171c formed at an intermediate position of the protector body 171 is formed in the direction parallel with the longitudinal direction of the protector body 171. Therefore, a discrepancy (or divergence) of the position of the mounting hole 5a can be absorbed when the locking claws 171c2 are locked into the respective mounting holes 5a.

As shown in FIG. 5, the coil antenna 18 has a structure, in which wire rod 182 is wound up around a coil bobbin 181, and is placed on a roller support member 8 situated between the two horizontal rollers 10. The coil antenna 18 is placed exactly at a middle position between the two horizontal rollers 10 and has an outer diameter and height, which do not exceed those of the horizontal roller 10, respectively. With this construction, the center of the coil antenna 18 can always maintain a position corresponding to the center of the coil antenna 17 even at a curved portion of the lower rail 5, thereby improving communication efficiency between both coil antennas.

Thus, if the coil antenna 18 is placed exactly at a middle position between the two horizontal rollers 10, even when there is a curved portion of the lower rail 5, the positional relation to the coil antenna 17 mounted on the lower rail 5 can be maintained constant, so that stable communication can be carried out not depending on an opened and closed condition of the slide door 1.

Figure 6:
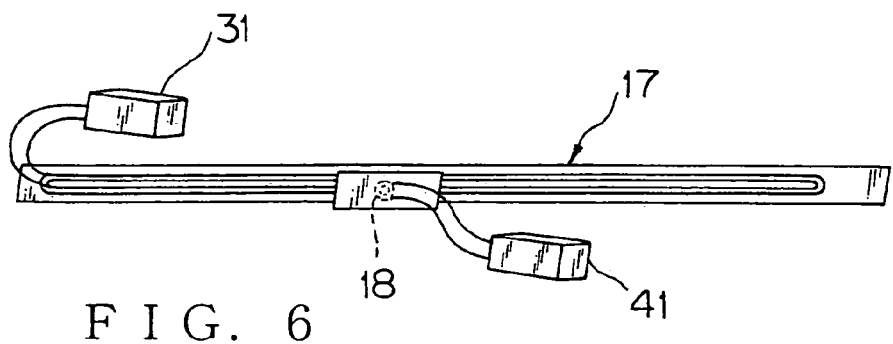
FIG. 6 is a view illustrating an electrical construction of the noncontacting short-range communication device for a slide door according to the present invention.

As shown in FIG. 6, the coil antenna 17 placed as described above is connected to a communication unit 31 as the first communication unit, which is received in the side of the vehicle body, while the coil antenna 18 is connected to a communication unit 41 as the second communication unit, which is received in the side of the slide door 1. The communication unit 31 has the same construction as that of the communication unit 41.

Figure 7:
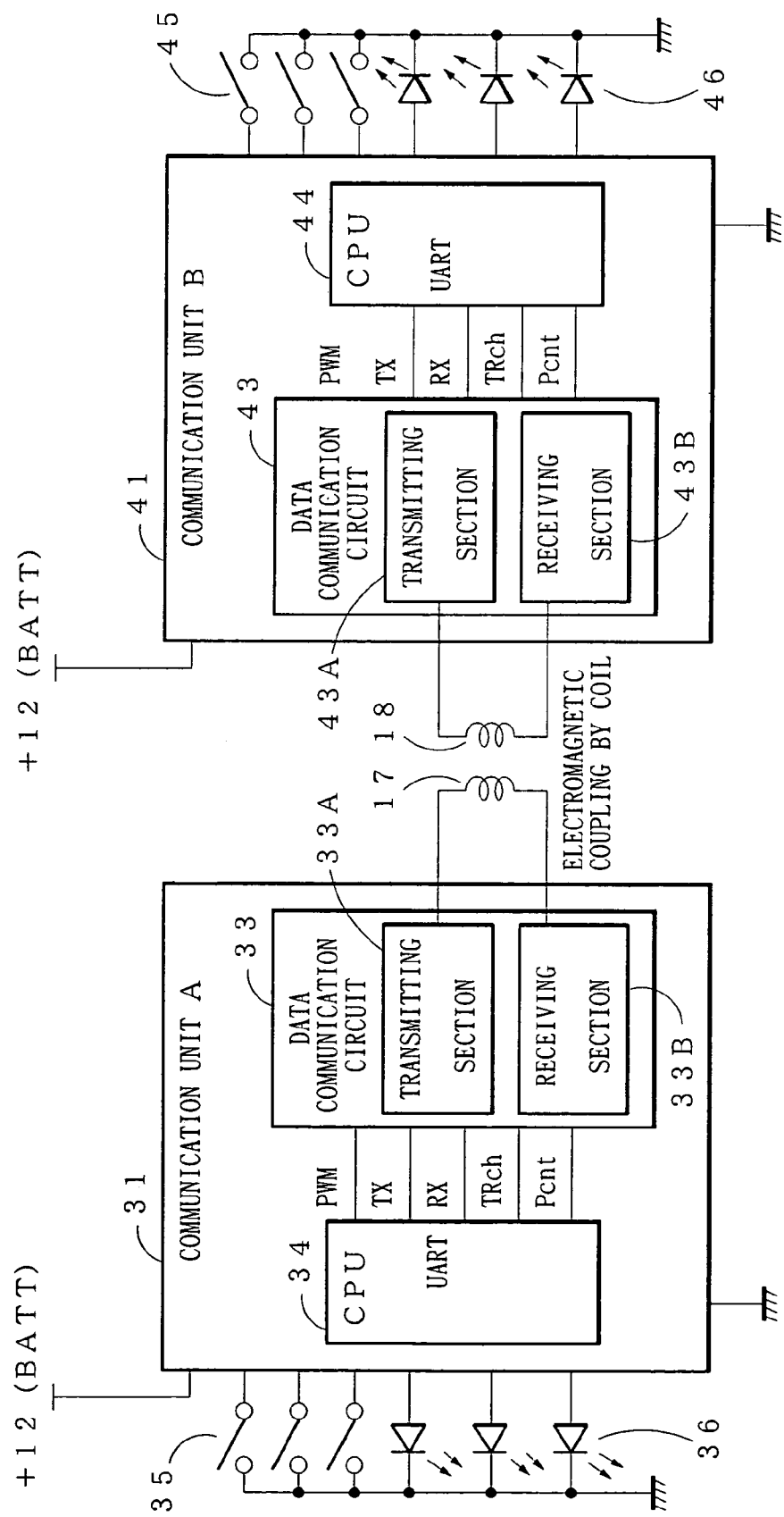
FIG. 7 is a block diagram illustrating an example of a construction of a communication unit shown in FIG. 6.

FIG. 7 is a block diagram illustrating an example of a construction of the communication unit shown in FIG. 6. As shown in FIG. 7, the communication unit 31 includes a data communication circuit 33 electrically supplied by a +12V-battery and a microcomputer (CPU) 34. The data communication circuit 33 includes a transmitting section 33A and receiving section 33B, each of which is connected to the coil antenna 17 and controlled by the CPU 34 so as to perform semi-duplex bidirectional communication. The CPU 34 is connected to various switches 35 for providing instruction signal for controlling auxiliary machines on the side of the slide door from the side of the vehicle and indicators 36 consisting of light emitting diode (LED) and so on.

Likewise, the communication unit 41 includes a data communication circuit 43 electrically supplied by a +12V-battery and a microcomputer (CPU) 44. The communication circuit 43 includes a transmitting section 43A and receiving section 43B, each of which is connected to the coil antenna 18 and controlled by the CPU 44 so as to perform semi-duplex bidirectional communication. The CPU 44 is connected to auxiliary machines such as a power window motor and door locking motor on the side of the slide door, said auxiliary machines being controlled on the basis of data transmitted from the side of the vehicle body, various switches 45, and indicators 46 consisting of light emitting diode (LED) and so on.

Figure 8:
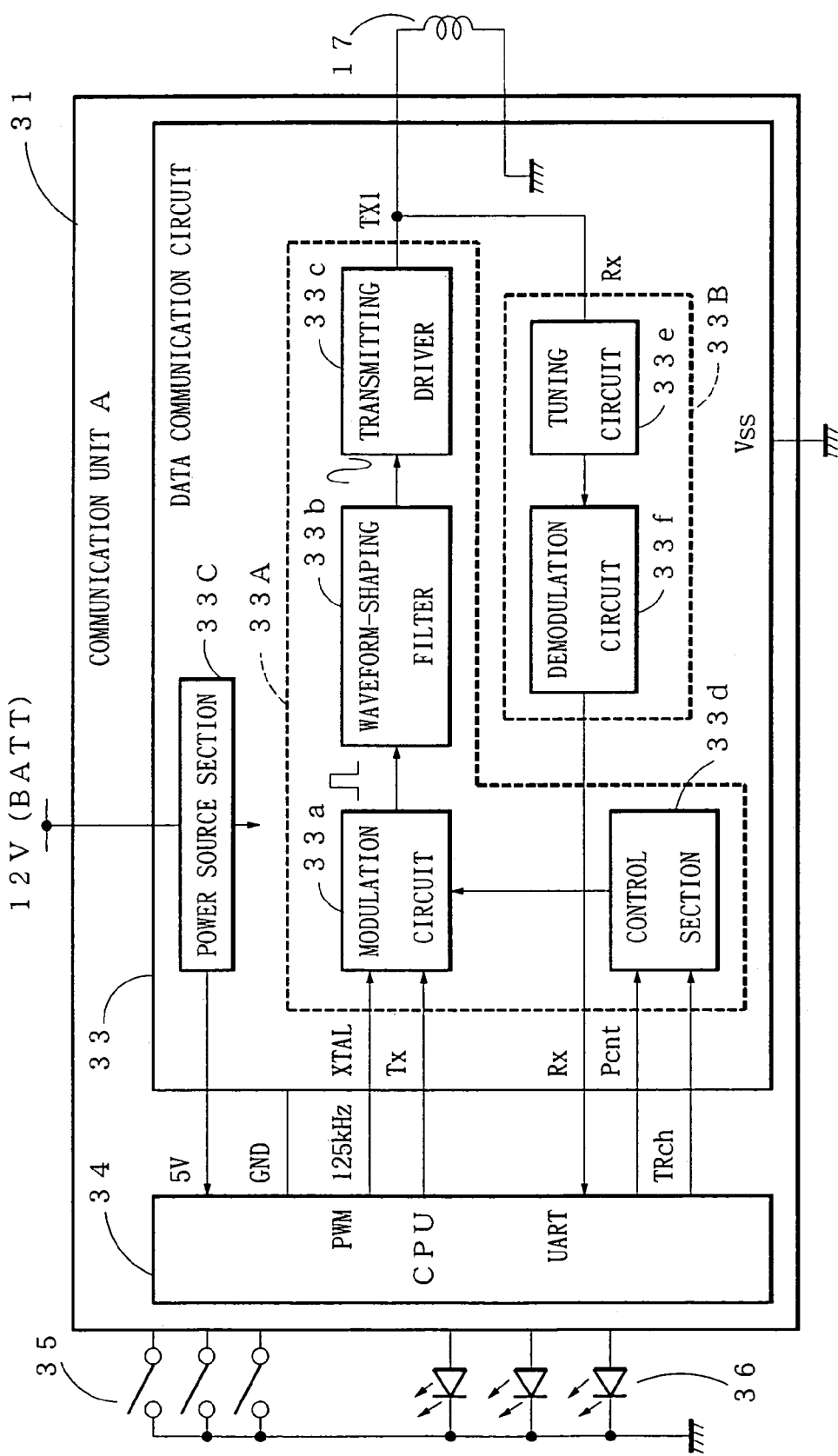
FIG. 8 is a detailed block diagram of the communication unit shown in FIG. 7.

FIG. 8 is a detailed block diagram of the communication unit 31. The data communication circuit 33 of the communication unit 31 includes a transmitting section 33A, receiving section 33B and power source section 33C. The transmitting section 33A includes: a modulation circuit 33a, to which a clock pulse (for example, 125 kHz) of the CPU 34 is supplied, for on-off modulating the clock pulse as a base signal with transmission data (Tx) having a serial communication form supplied from the CPU 34; a waveform-shaping filter 33b for waveform-shaping a modulated wave pulse from the modulation circuit 33a to a sine wave; a transmitting driver 33c, to which an output from the waveform-shaping filter 33b is supplied, for driving the coil antenna 17; and control section 33d which controls to switch the data communication circuit 33 to a transmission-allowed condition or reception-allowed condition on the basis of a transmission/reception switching signal (TRch) from the CPU 34 and controls to switch the data communication circuit 33 to a low electric power consumption mode on the basis of a power control signal (Pcnt) from the CPU 34.

The receiving section 33B includes: a tuning circuit 33e, which is connected to the coil antenna 17, for tuning to a clock pulse frequency (125 kHz) of the CPU 34; and a demodulation circuit 33f for demodulating an output from the tuning circuit 33e so as to gain data in a serial communication form and for supplying the data to the CPU 34.

The power source section 33C is connected to a +12 V-battery, supplies an appropriate power voltage to the sections of the data communication circuit 33, and supplies +5 V power voltage to the CPU 34.

Figure 9:
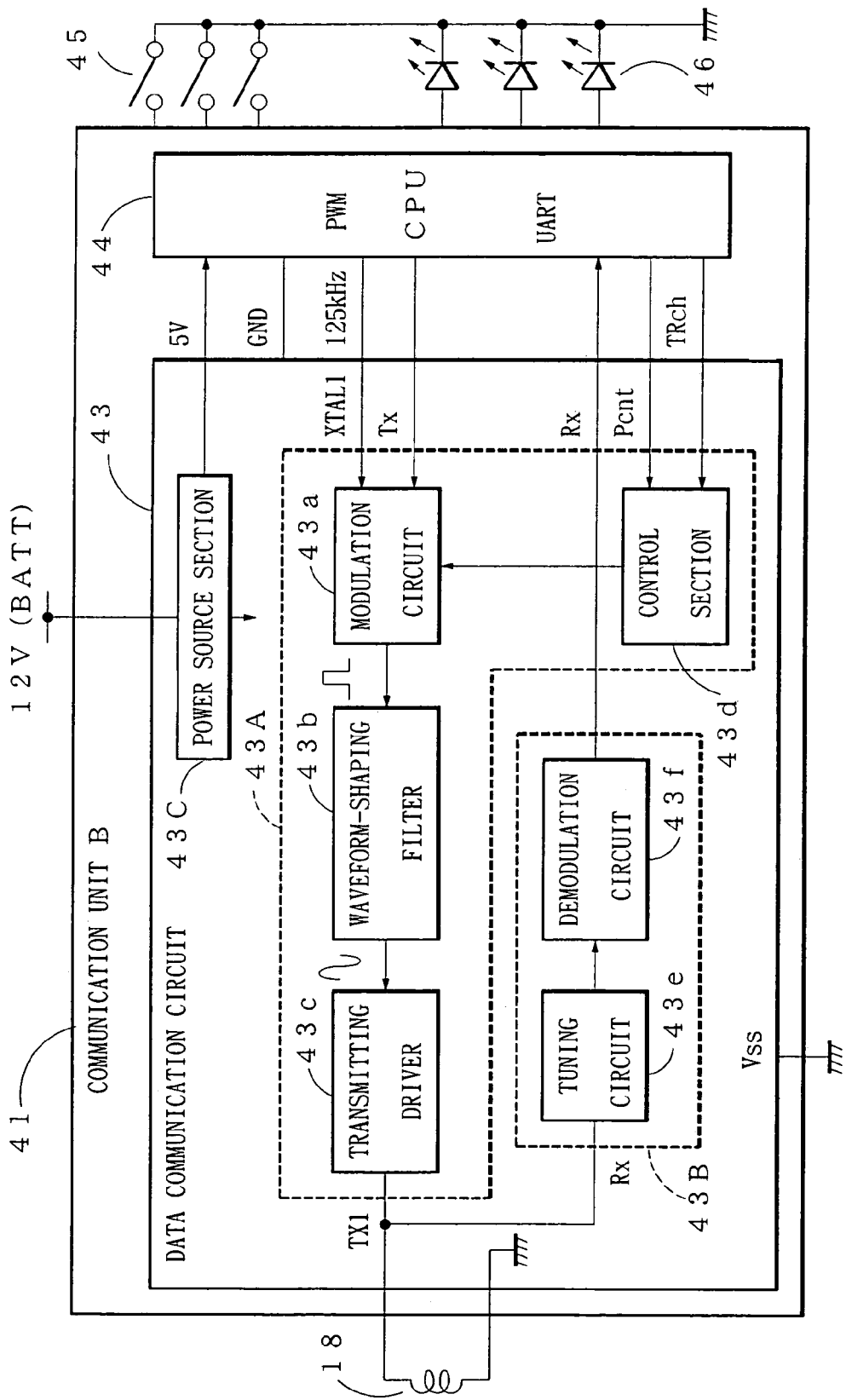
FIG. 9 is a detailed block diagram of the communication unit shown in FIG. 7.

FIG. 9 is a detailed block diagram of the communication unit 41. The data communication circuit 43 of the communication unit 41 includes a transmitting section 43A, receiving section 43B and power source section 43C. The transmitting section 43A includes: a modulation circuit 43a, to which a clock pulse (for example, 125 kHz) of the CPU 44 is supplied, for on-off modulating the clock pulse as a base signal with transmission data (Tx) having a serial communication form supplied from the CPU 44; a waveform-shaping filter 43b for waveform-shaping a modulated wave pulse from the modulation circuit 43a to a sine wave; a transmitting driver 43c, to which an output from the waveform-shaping filter 43b is supplied, for driving the coil antenna 18; and control section 43d which controls to switch the data communication circuit 43 to a transmission-allowed condition or reception-allowed condition on the basis of a transmission/reception switching signal (TRch) from the CPU 44 and controls to switch the data communication circuit 43 to a low electric power consumption mode on the basis of a power control signal (Pcnt) from the CPU 44.

The receiving section 43B includes: a tuning circuit 43e, which is connected to the coil antenna 18, for tuning to a clock pulse frequency (125 kHz) of the CPU 44; and a demodulation circuit 43f for demodulating an output from the tuning circuit 43e so as to gain data in a serial communication form and for supplying the data to the CPU 44.

The power source section 43C is connected to a +12 V-battery, supplies an appropriate power voltage to the sections of the data communication circuit 43, and supplies +5 V power voltage to the CPU 44.

Figure 10:
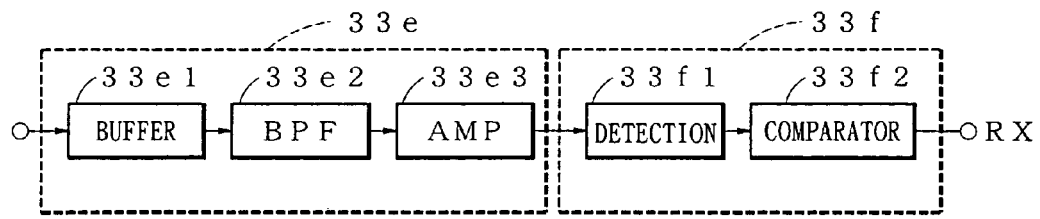
FIG. 10 is a detailed block diagram of a receiving section in the communication unit shown in FIG. 8.

FIG. 10 is a detailed block diagram of the receiving section 33B. The receiving section 33B includes the tuning circuit 33e and the demodulation circuit 33f. The tuning circuit 33e includes: a buffer 33e1 connected to the coil antenna 17, to which buffer a received signal received by the coil antenna 17 is inputted; a bandpass filter (BPF) 33e2, to which an output from the buffer 33e1 is inputted, for passing a 125 kHz component of the received signal; and amplifier 33e3, to which an output from the BPF 33e2 is inputted, for amplifying the inputted output. The demodulation circuit 33f includes: a detection circuit 33f1, to which an output from the amplifier 33e3 is inputted, for detecting the inputted output; and a comparator 33f2 as the first comparator, to which a detected output from the detection circuit 33f1 is inputted, for comparing amplitude of the detected output with the first threshold level so as to gain data (Rx) in a serial communication form and to supply the data to the CPU 34.

Figure 11:
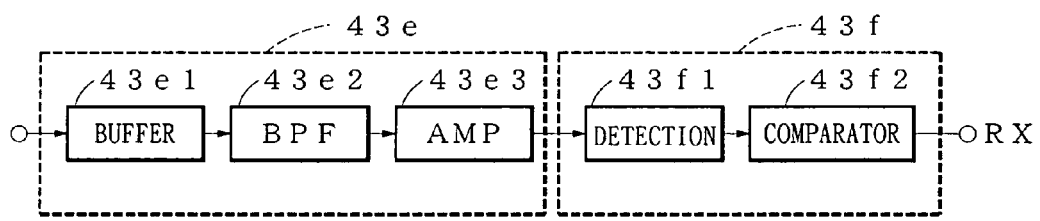
FIG. 11 is a detailed block diagram of a receiving section in the communication unit shown in FIG. 9.

FIG. 11 is a detailed block diagram of the receiving section 43B. The receiving section 43B includes the tuning circuit 43e and the demodulation circuit 43f. The tuning circuit 43e includes: a buffer 43e1 connected to the coil antenna 18, to which buffer a received signal received by the coil antenna 18 is inputted; a bandpass filter (BPF) 43e2, to which an output from the buffer 43e1 is inputted, for passing a 125 kHz component of the received signal; and amplifier 43e3, to which an output from the BPF 43e2 is inputted, for amplifying the inputted output. The demodulation circuit 43f includes: a detection circuit 43f1, to which an output from the amplifier 43e3 is inputted, for detecting the inputted output; and a comparator 43f2 as the first comparator, to which a detected output from the detection circuit 43f1 is inputted, for comparing amplitude of the detected output with the first threshold level so as to gain data (Rx) in a serial communication form and to supply the data to the CPU 44.

Figure 12:
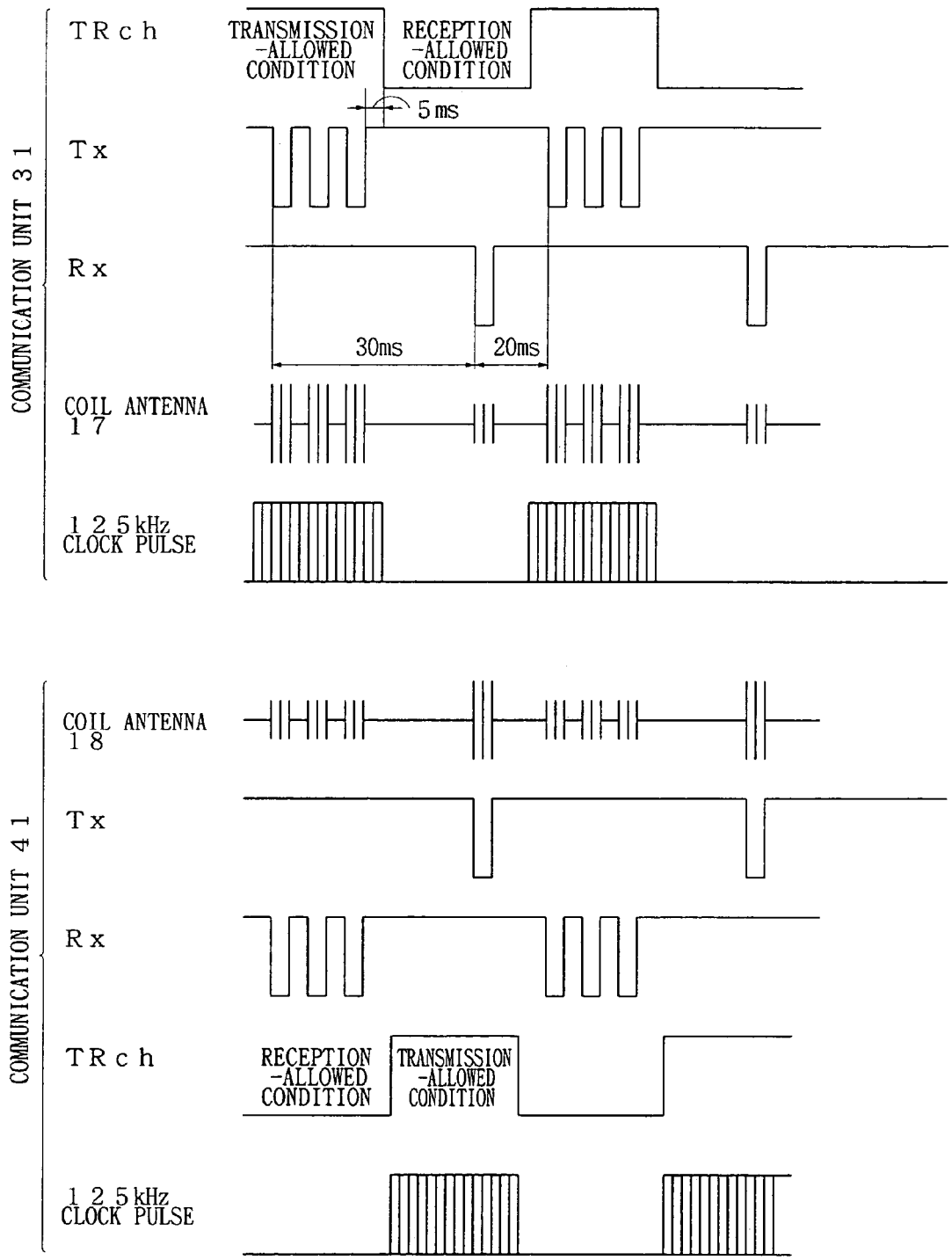
FIG. 12 shows signal waveforms of respective sections in the communication unit.

In the following, a normal action of the noncontacting short-range communication device for a slide door having the structure described above will be explained with reference to signal waveforms shown in FIG. 12. The communication unit 31 and communication unit 41 can alternately perform transmission and reception by the transmission/reception switching signal TRch in such a manner that when one of them is in a transmission-allowed condition, the other is in a reception-allowed condition.

When data are transmitted from the communication unit 31 to the communication unit 41, the CPU 34 in the communication unit 31 supplies a 125 kHz clock pulse to the modulation circuit 33a upon the transmission-allowed condition with the transmission/reception switching signal TRch, receives data based on an instruction signal given by various switches in a serial communication form, and supplies the data as transmission data (Tx) to the modulation circuit 33a. The modulation circuit 33a on-off modulates the 125 kHz clock pulse as a base signal with the transmission data having a serial communication form and supplies a modulated wave pulse output to the waveform-shaping filter 33b. The waveform-shaping filter 33b shapes the modulated wave pulse output from the modulation circuit 33a and supplies a modulated wave output having a sine wave-shape to the transmitting driver 33c. The transmitting driver 33c amplifies the modulated wave output having a sine wave-shape from the waveform-shaping filter 33b and supplies the amplified output to the coil antenna 17 so as to drive the coil antenna 17.

When the communication unit 31 is in a transmission-allowed condition, the communication unit 41 is in a reception-allowed condition. Then, the coil antenna 18 in the communication unit 41 receives the modulated wave having a sine wave-shape from the coil antenna 17 by means of electromagnetic induction coupling. The modulated wave having a sine wave-shape transmitted to the coil antenna 18 is supplied to the tuning circuit 43e, extracted by the BPF 33e2, and supplied to the demodulation circuit 43f. The modulated wave having a sine wave-shape supplied to the demodulation circuit 43f is detected by the detection circuit 43f1. Then, a detected wave output thus detected is supplied to the comparator 33f2, and the data (Rx (=Tx)) having a serial communication form is gained and supplied to the CPU 44. The CPU 44 controls auxiliary machines on the side of the slide door such as a power window motor and door locking motor and the various switches according to the supplied data (Rx) having a serial communication form and lights up the corresponding indicator 46.

In a case when data are transmitted from the communication unit 41 to the communication unit 31, only the transmission and the reception as described above are changed with each other, resulting in that the bidirectional communication becomes possible. In this connection, reception from the communication unit 41 after reception from the communication unit 31 is started, for example, 30 ms after a start of the reception from the communication unit 31, while next reception from the communication unit 31 after reception from the communication unit 41 is started, for example, 20 ms after a start of the reception from the communication unit 41, and subsequent actions are performed likewise.

Figure 13:
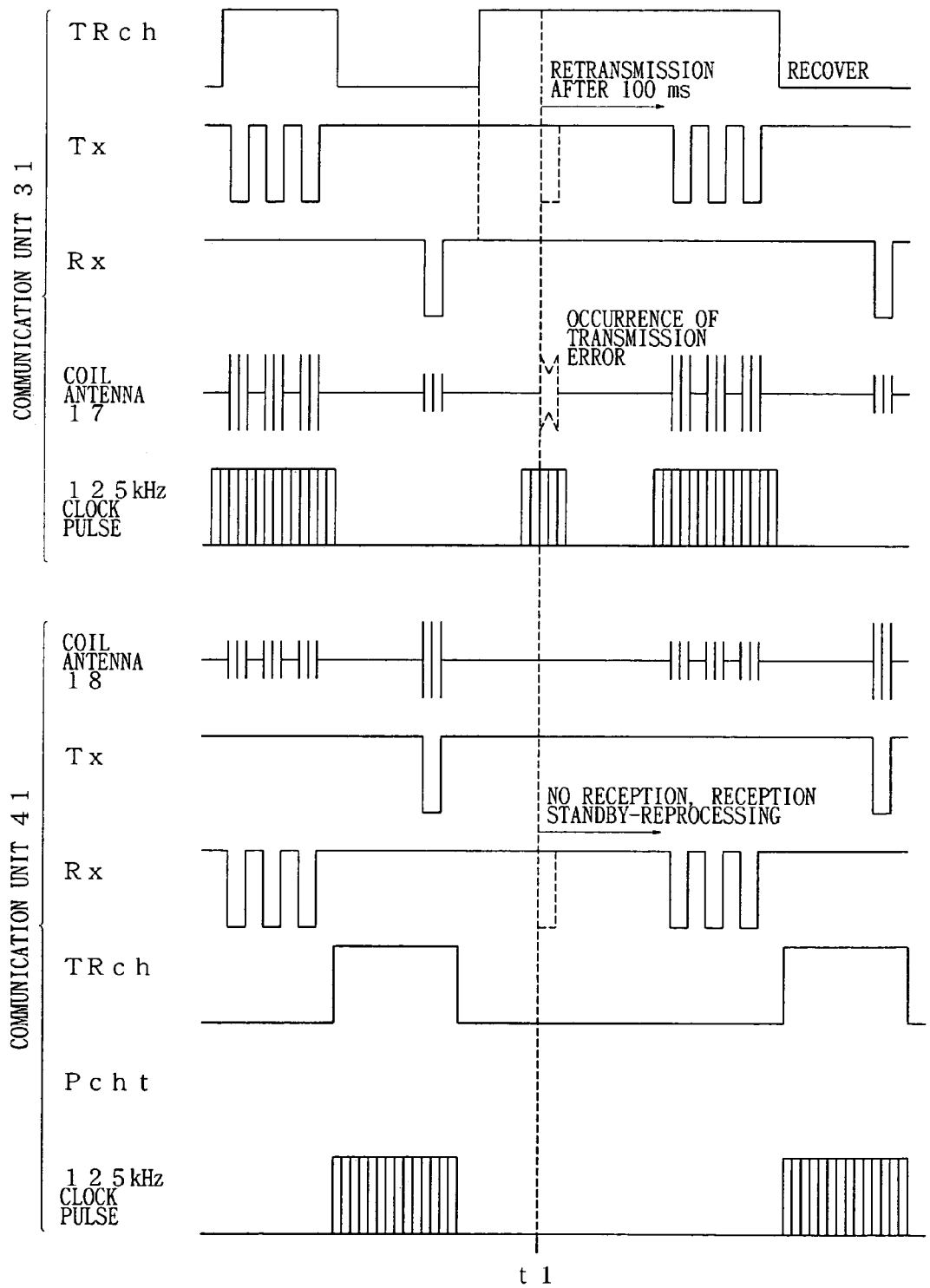
FIG. 13 shows signal waveforms of respective sections in the communication unit upon processing for transmitting error.

In the following, an action for processing a transmission error of the noncontacting short-range communication device for a slide door having the structure described above will be explained with reference to signal waveforms shown in FIG. 13. As shown in FIG. 13, in a case when transmission data Tx are lost to cause a transmission error of non-drive of the coil antenna 17 at a time point of t1, the CPU 34 maintains the transmission-allowed condition and transmits the transmission data Tx to the modulation circuit 33a again after a specific time period (for example, 100 milliseconds, i.e. 100 ms) elapses after the transmission error. The modulation circuit 33a on-off modulates the 125 kHz clock pulse with the transmission data transmitted again, outputs a modulated wave pulse, and drives the coil antenna 17 through the waveform-shaping filter 33b and the transmitting driver 33c.

Meanwhile, the communication unit 41 is in a reception-standby condition since the gain data (reception data) Rx is not gained upon a reception-allowed condition, but at a time point when data are transmitted again from the communication unit 31 after the elapse of 100 ms, the communication unit 41 performs reception and demodulation so as to gain the reception data Rx. Thereafter, the system is recovered to a normal action condition from the transmission error condition, then the communication unit 31 is switched into a reception-allowed condition while the communication unit 41 is switched into a transmission-allowed condition.

In the following, an action for processing a reception error of the noncontacting short-range communication device for a slide door having the structure described above will be explained with reference to signal waveforms shown in FIG. 14. As shown in FIG. 14, upon a normal action, the communication unit 41 is in a reception-standby condition until a specific time period (for example, 200 ms) elapses after the reception data Rx is gained. But in a case when a reception error occurs at a time point t2, wherein the reception error causes a problem that the modulated wave from the communication unit 41 is not transmitted due to some reason and that the reception data Rx is not gained, the CPU 44 maintains the reception-allowed condition. Therefore, transmission from the communication unit 41 is not performed.

Meanwhile, the communication unit 31 transmits the transmission data Tx again after a specific time period (for example, 100 ms) longer than that upon a normal action elapses because there is no transmission from the communication unit 41 and the reception data Rx is not gained upon a reception-allowed condition.

Meanwhile, the communication unit 41 is in a standby condition maintaining the reception-allowed condition, but when the communication unit 41 can receive the transmission data Tx transmitted again from the communication unit 31 after completion of the reception-standby condition, the communication unit 41 demodulates the transmission data Tx so as to gain the reception data Rx, and afterward the communication unit 41 recovers a normal action.

In the following, an action for processing a sleep or wake-up of the noncontacting short-range communication device for a slide door having the structure described above will be explained with reference to signal waveforms shown in FIG. 15. As shown in FIG. 15, when the transmission or reception of data is not performed, the communication unit 41 regards that a condition of a sleep is attained if reception-standby condition continues for 400 ms and the communication unit 41 becomes in a sleep-standby condition for a specific time period (for example, 3 seconds, i.e. 3 sec). Then, after the sleep-standby for 3 sec, a power control signal (Pcnt) from the CPU 44 is supplied to the control section 43d, then correspondingly, the control section 43d controls so that the 125 kHz clock pulse in the modulation circuit 43a is stopped, thereby the communication unit 41 is in a standby in a low electric power consumption mode condition.

Then, when the communication unit 41 performs reception with an event detection or transmission of a wake-up signal in the communication unit 31, the CPU 44 halts supply of a power control signal (Pcnt) to the control section 43d, and thereafter the recover to a normal action from the low electric power consumption mode condition is performed.

Thus, the bidirectional communication according to the present invention is always possible even when the slide door 1 slides to the vehicle body. The coil antennas 17 and 18 are held facing to each other having a constant distance as small as several millimeters therebetween, thereby forming electromagnetic induction coupling between both coil antennas and enabling to obtain reception level good enough to be sufficiently recognized as data. Further, with this construction, since flat coil antennas 17 and 18 are attached to the rail 5 and roller support member 8 consisting of grounded metal, respectively, one side of each of them is set close to ground (i.e. earth), thereby reducing radiation noise as little as possible.

As explained above, with the first preferred embodiment of the noncontacting short-range communication device for a slide door according to the present invention, transmitting and receiving of the noncontacting data between the sides of the vehicle body and slide door by cheap and simple electromagnetic coupling becomes always possible in a semi-duplex bidirectional communication form. Moreover, since the communication can be attained by using weak outputs in a limited area having the communication distance within several millimeters, noises can be prevented from being released to the outside and necessary data can be transmitted and received without any interference with the other communication. Furthermore, upon mounting of the device of the present invention, there is no anxiety that the bending of the electric wires might cause the breaking of the electric wires. There is no anxiety that water or dust might cause poor electrical quality, thereby improving the reliability.

When the bidirectional communication is to be performed between the two communication units, for example, an impedance of a coil antenna connected to one communication unit is lower than that of a coil antenna connected to another communication unit, a voltage level of a received wave of the one communication unit becomes smaller than that of a received wave of the other communication unit, so that reception efficiency of the one communication unit becomes worse than that of the other communication unit, causing unbalance.

In order to solve the above problem, as a modification of the first preferred embodiment of the present invention, an impedance-adjusting transformer is inserted between the coil antenna and the transmitting and receiving sections of the communication unit that has worse reception efficiency, thereby improving the reception efficiency and taking balance of the reception efficiency of the two communication units.

Such a modification of the first preferred embodiment of the present invention as described above will be explained with reference to FIGS. 16 and 17. Here, in order to make the explanation simple, as an example, such a case is considered that the impedance of the coil antenna 17 is lower than that of the coil antenna 18 so that the reception efficiency of the communication unit 31 is lower than that of the communication unit 14.

Figure 16:
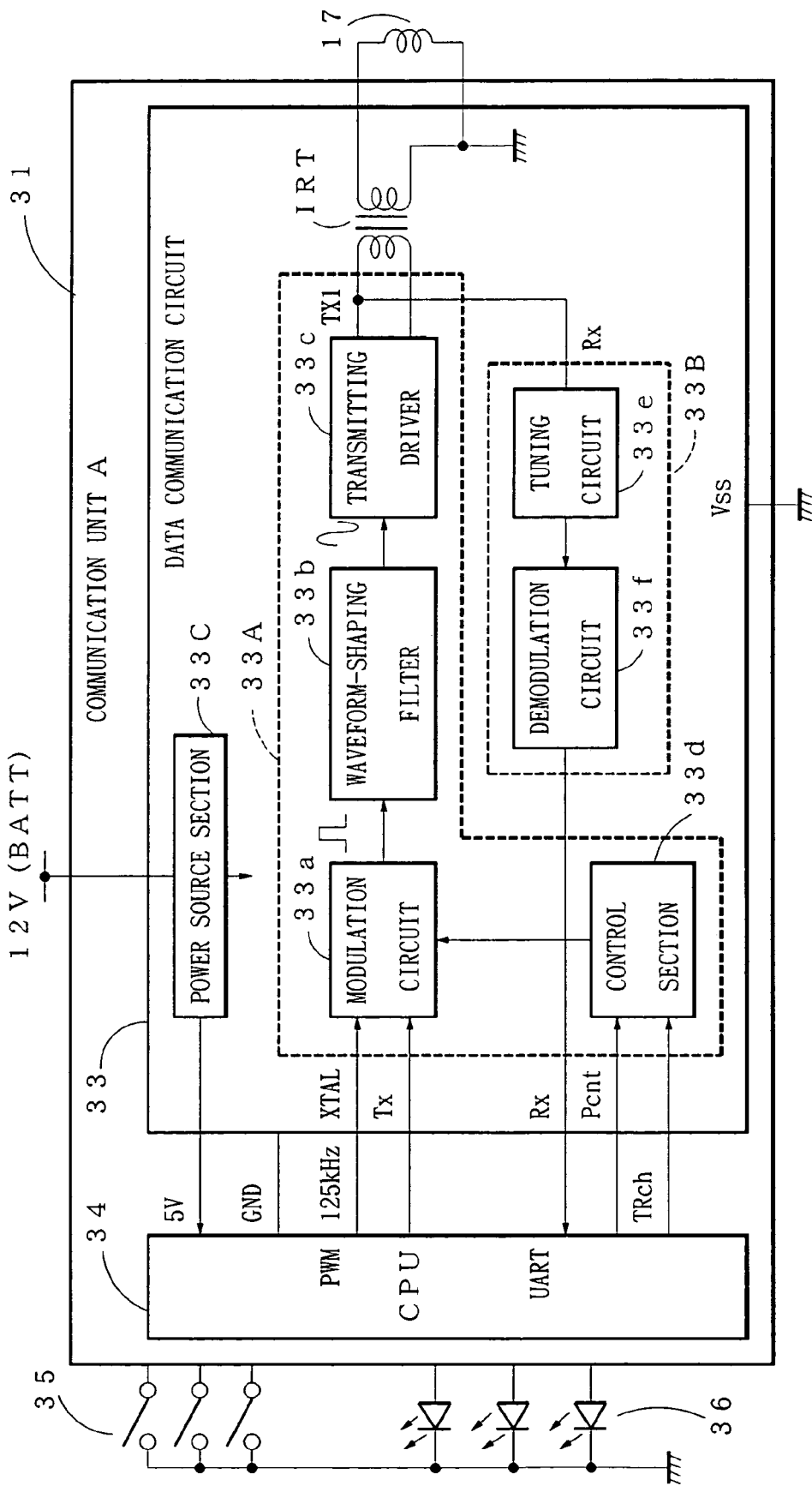
FIG. 16 is a block diagram illustrating an example of a construction of a communication unit in the second preferred embodiment of the noncontacting short-range communication device for a slide door according to the present invention.

FIG. 16 shows such an example of the modification of the communication unit 31 shown in FIG. 8, wherein a high frequency transformer IRT as the impedance-adjusting transformer is inserted between the coil antenna 17 and the transmitting driver 33c of the transmitting section 33A and the tuning circuit of the receiving section 33B. This high frequency transformer 33g has construction in which a ratio of number of turns on the side of the transmitting driver 33*c* with respect to that on the side of the coil antenna 17 is set 4:1, for example.

In a case when the bidirectional communication is performed between the communication unit 31 shown in FIG. 16 and the communication unit 41 shown in FIG. 9, when data is transmitted from is the communication unit 31 to the communication unit 41, a voltage level of transmitting output outputted from the transmitting driver 33*c* of the transmitting section 33A is decreased to be ¼ in the coil antenna 17 due to the existence of the high frequency transformer IRT. However, since the high frequency transformer IRT is connected thereto, the impedance is higher than that when the coil antenna 17 is simply directly connected thereto. Since an amplitude voltage of the transmitting output, which is four times higher than that of a case when the coil antenna 17 is directly connected thereto, is supplied to the high frequency transformer IRT, therefore as shown in FIG. 8, the transmitting driver 33*c* can supply transmitting output having a voltage level, which is similar to that of the communication unit 31 of a case when the high frequency transformer IRT is not connected thereto, to the coil antenna 17.

On the other hand, in a case when the communication unit 31 having low antenna impedance receives data from the communication unit 41 having higher antenna impedance, since the impedance of the high frequency transformer situated on the side connected to the tuning circuit 33*e* of the receiving section 33B is higher than that of the coil antenna 17, as shown in FIG. 8, a weak reception amplitude voltage from the coil antenna 18 is four times amplified by the high frequency transformer IRT in comparison with a case when the coil antenna 17 is directly connected to the tuning circuit 33*e*, then thus amplified reception amplitude voltage is supplied to the tuning circuit 33*e* of the receiving section 33B. As a result, a low critical point of the reception efficiency by the coil antenna 17 having a low impedance is improved, so that the communication efficiency of the communication unit 31 can be improved with the structure shown in the block diagram of FIG. 16 in comparison with the reception efficiency in the case as shown in the block diagram of FIG. 8.

FIG. 17 is a graph showing a reception efficiency characteristic of the communication units 31 and 41 with respect to an antenna distance between the coil antennas 17 and 18. In FIG. 17, a curve A shows reception efficiency of the communication unit 41 (see block diagram of FIG. 9), a curve B shows reception efficiency of the communication unit 31 with the high frequency transformer IRT (see block diagram of FIG. 16), and a curve B' shows reception efficiency of the communication unit 31 without the high frequency transformer IRT (see block diagram of FIG. 8). FIG. 17 reveals that the reception efficiency of the communication unit 31 improves from the curve B' to the curve B by inserting the high frequency transformer IRT, which curve B almost overlaps with the curve A that shows the reception efficiency of the communication unit 41.

Thus, with the high frequency transformer IRT, a low critical point of the reception efficiency by the coil antenna 17 having a low impedance is improved, so that the reception efficiency of the communication unit 31 can be balanced with that of the communication unit 41, resulting in that a communicable distance between the coil antennas 17 and the coil antenna 18 can be enlarged. Moreover, as an effect of the insertion of the high frequency transformer IRT, when a communication wave having a sine wave-form is supplied to the coil antenna and the antenna impedance is low, in a case of no insertion of the high frequency transformer IRT, the wave form becomes dull and the transmission efficiency to the receiving section is deteriorated even at the same peak voltage. On the other hand, in a case of insertion of the high frequency transformer IRT, the wave is waveform-shaped, thereby improving the reception efficiency.

Inversely, if the impedance of the coil antenna 18 is lower than that of the coil antenna 17, the impedance-adjusting transformer is inserted between the coil antenna 18 of the communication unit 41 and the transmitting section 43A and receiving section 43B. In the above explanation, the high frequency transformer 33*g* has construction in which a ratio of number of turns on the side of the transmitting driver 33*c* with respect to that on the side of the coil antenna 17 is set 4:1, for example. However, this ratio of number of turns can be appropriately changed according to a degree of the unbalance between the reception efficiency of the communication unit 31 and that of the communication unit 41.

In the following, the second preferred embodiment of a noncontacting short-range communication device for a slide door according to the present invention will be explained with reference to FIGS. 18–23.

In the second preferred embodiment, the structure of the communication units 31 and 41 shown in FIGS. 1–11 is modified a little. Here, an ID code for security in the semi-duplex bidirectional communication is introduced, wherein the communication units 31 and 41 have a normal communication mode and ID code-rewriting mode as operation modes, respectively, and the ID code is made possible to be rewritten when the communication units are exchanged.

Figure 18:
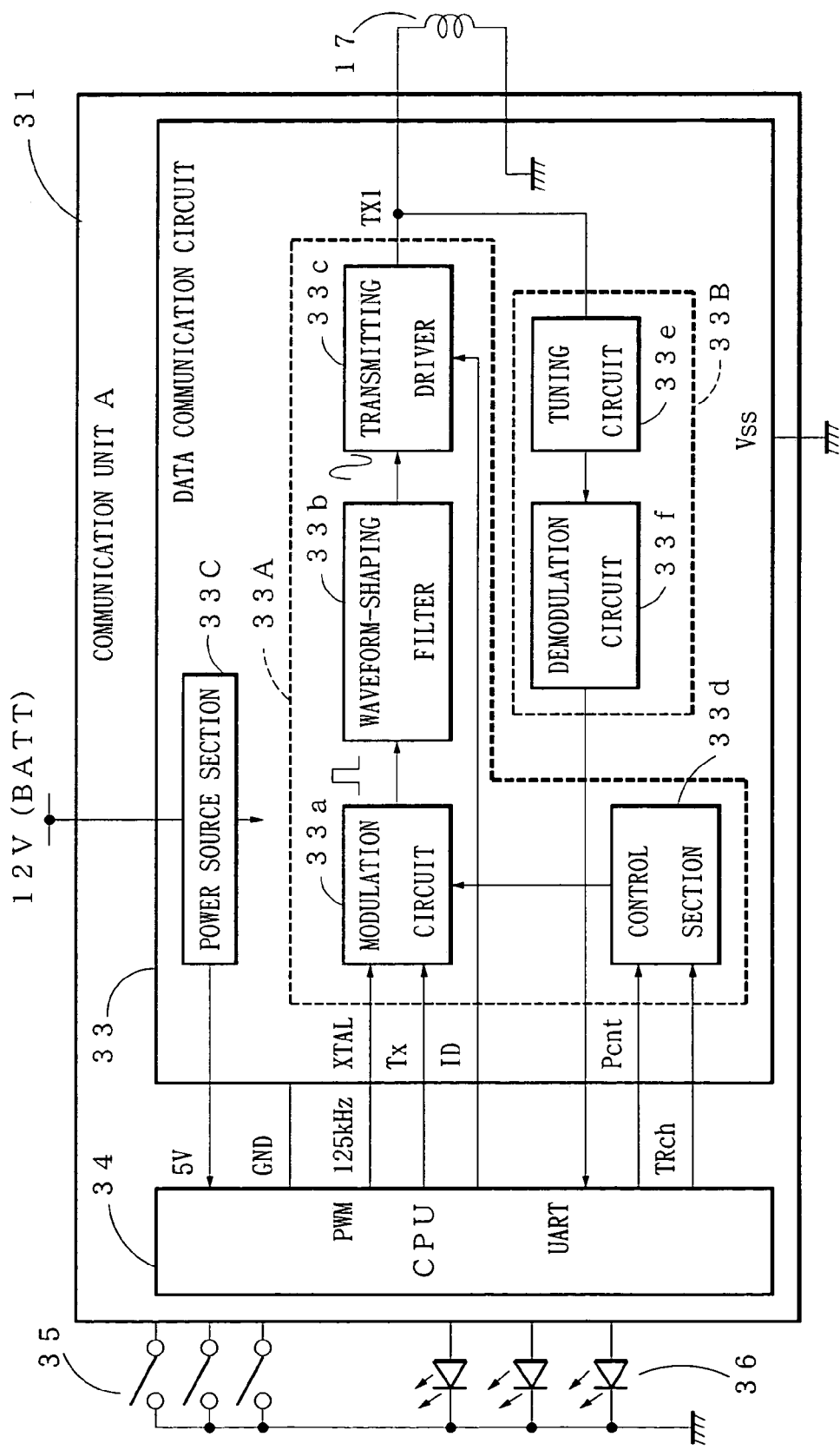
FIG. 18 is a detailed block diagram of a receiving section in the communication unit shown in FIG. 16.
Figure 19:
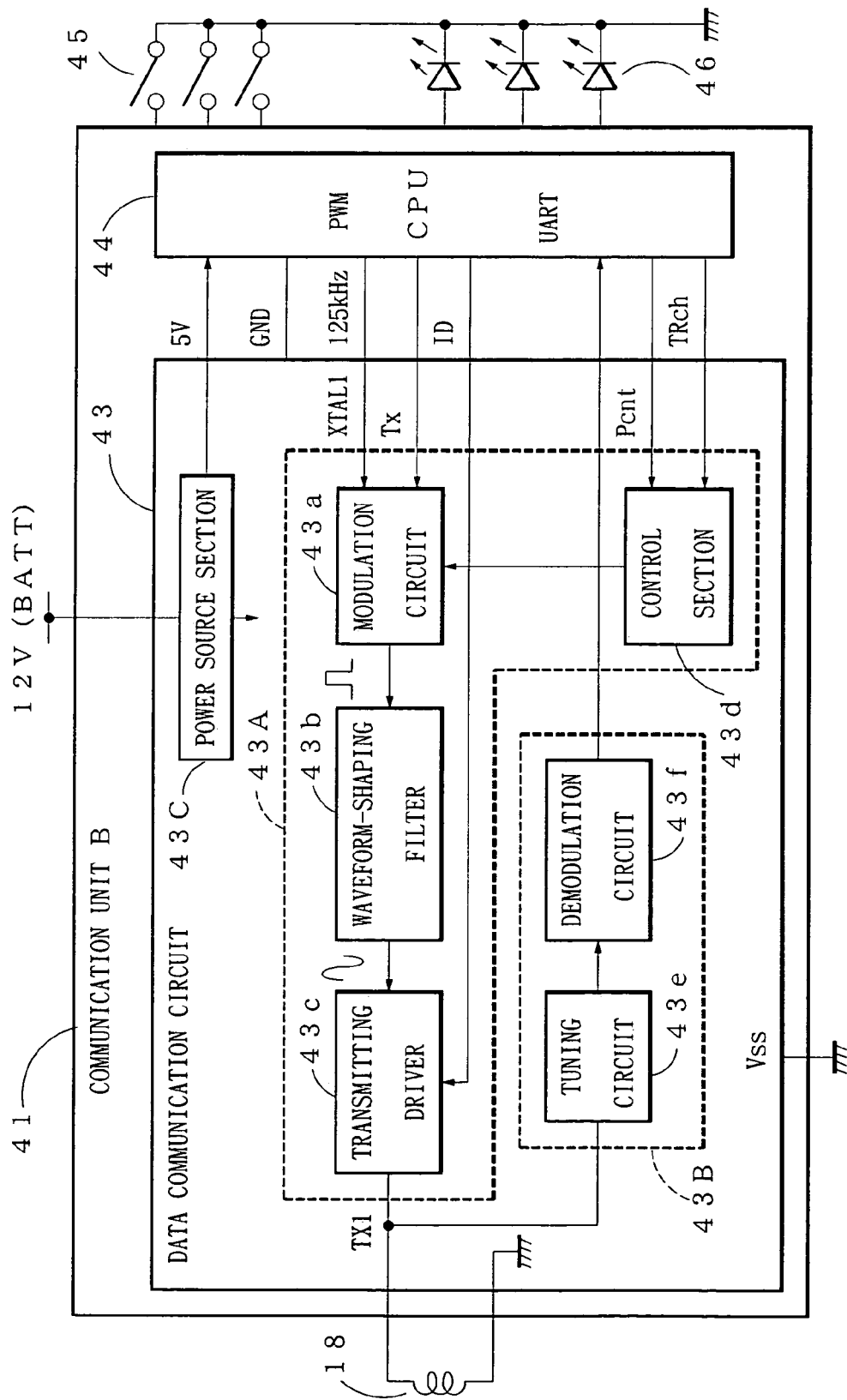
FIG. 19 is a detailed block diagram of a receiving section in the communication unit shown in FIG. 17.

FIGS. 18 and 19 are detailed block diagrams of the communication units 31 and 41, respectively, in the second preferred embodiment. The communication unit 31 shown in FIG. 18 includes the same constitutional elements as those of the communication unit 31 in the first preferred embodiment shown in FIG. 8 and further includes additional constitution, in which an ID rewriting control signal is supplied from an ID terminal of the CPU 34 to the transmitting driver 33*c* of the transmitting section 33A in the data communication circuit 33. In the communication unit 31, the ID code and data based on instruction signals given by the switches 35 are supplied from the CPU 34 to the modulation circuit 33*a* as the transmission data (Tx) in a serial communication form.

Figure 20:
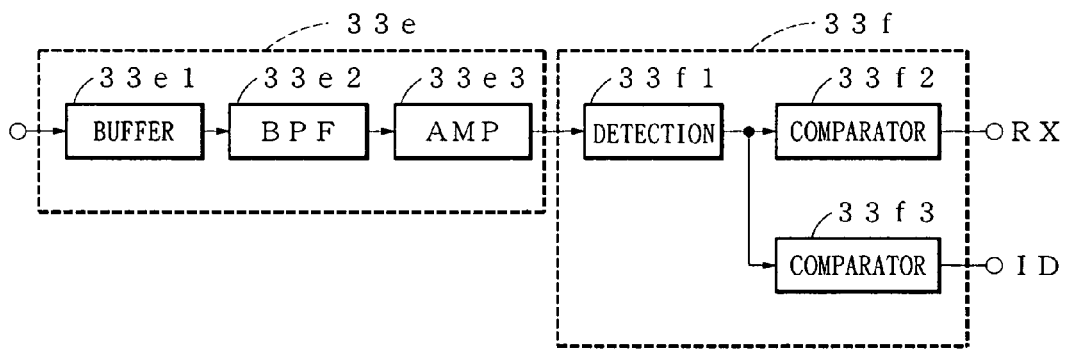
FIG. 20 is a flow chart illustrating processing in the communication unit.

As shown in the detailed block diagram of FIG. 20, the demodulation circuit 33*f* of the receiving section 33B shown in FIG. 18 is provided with a comparator 33*f*3 as the second comparator besides the demodulation circuit 33*f* in the first preferred embodiment shown in FIG. 10. A detected output from the detection circuit 33*f*1 is inputted to the comparator 33*f*3. The comparator 33*f*3 compares the amplitude of the detected output with the second threshold level that is higher than the first threshold level used in a comparator 33*f*2 as the first comparator, so that comparator 33*f*3 gains an ID code and supplies the ID code to the CPU 34.

FIG. 19 is a detailed block diagram of the communication unit 41 in the second preferred embodiment. The communication unit 41 shown in FIG. 19 includes the same constitutional elements as those of the communication unit 41 in the first preferred embodiment shown in FIG. 9 and further includes additional constitution, in which an ID rewriting control signal is supplied from an ID terminal of the CPU 44 to the transmitting driver 43*c* of the transmitting section 43A in the data communication circuit 43. In the communication unit 41, the ID code and data based on instruction signals given by the switches 45 are supplied from the CPU 44 to the modulation circuit 43*a* as the transmission data (Tx) in a serial communication form.

Figure 21:
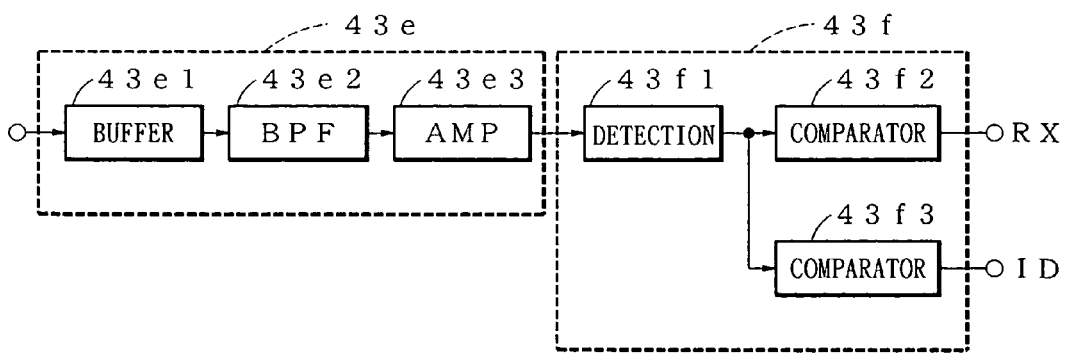
FIG. 21 shows signal waveforms of respective sections in the communication unit.

As shown in the detailed block diagram of FIG. 21, the demodulation circuit 43*f* of the receiving section 43B shown in FIG. 19 is provided with a comparator 43/3 as the second comparator besides the demodulation circuit 43/*f* in the first preferred embodiment shown in FIG. 11. A detected output from the detection circuit 43/1 is inputted to the comparator 43/3. The comparator 43/3 compares the amplitude of the detected output with the second threshold level that is higher than the first threshold level used in a comparator 43/2 as the first comparator, so that comparator 43/3 gains an ID code and supplies the ID code to the CPU 44.

Figure 23:
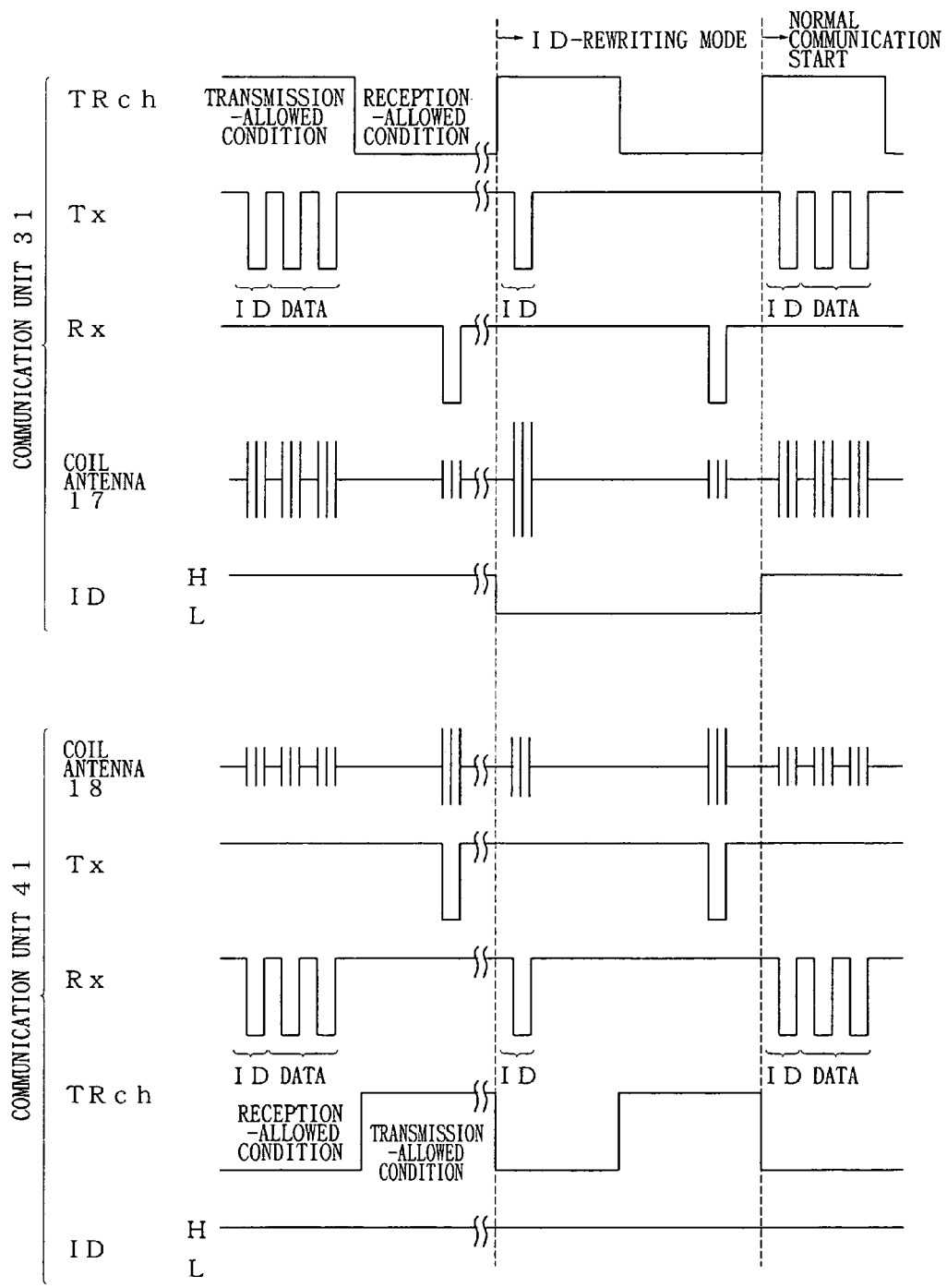
FIG. 23 shows signal waveforms of respective sections in the communication unit.

In the following, an action of the noncontacting short-range communication device for a slide door according to the second preferred embodiment having the structure as described above will be explained with reference to the signal waveforms shown in FIG. 23.

First, an action upon a normal communication mode will be explained. In a normal condition, the communication units 31 and 41 act in a normal communication mode, that is, performs communication by using a weak output of a modulated wave including data based on instruction signals given by the switches 35 through the coil antennas 17 and 18, thereby reducing noises generated due to electromagnetic coupling. Upon such a normal communication mode, the ID code-rewriting control signals of the ID terminals of the CPU 34 and 44 maintains a high level (for example, 5 volts) and a transmission output level of the transmitting drivers 33*c* or 43*c* is set to be a weak output level for a normal communication mode.

When an ID code and data are transmitted from the communication unit 31 to the communication unit 41, the CPU 34 of the communication unit 31 supplies a 125 kHz clock pulse to the modulation circuit 33*a* upon a transmission-allowed condition and receives the ID code and the data based on the instruction signals given by the switches 35 in a serial communication form as the transmission data (Tx) so as to supply them to the modulation circuit 33*a*. The modulation circuit 33*a* on-off modulates the 125 kHz clock pulse as a base signal with the transmission data (Tx) and supplies a modulated wave output to the waveform-shaping filter 33*b*. The coil antenna 17 is driven with the modulated wave output through the transmitting driver 33*c*.

The communication unit 41 receives the modulated wave transmitted from the coil antenna 17 with the coil antenna 18 by means of electromagnetic induction coupling. The modulated wave received is supplied to the receiving section 43B, then supplied to the comparator 33/2 as the first comparator in the demodulation circuit 43*f*, then compared with the first threshold level so that the reception data (Rx (=Tx)) having a serial communication form is gained, and then supplied to the CPU 44. The CPU compares the ID code included in the supplied reception data (Rx) with an ID code stored in advance in an internal memory (not shown in the figure). When the ID codes compared do not coincide with each other, the CPU 44 makes the data included in the reception data (Rx) void.

On the other hand, when the compared ID codes coincide with each other, the CPU 44 makes the data included in the reception data (Rx) effective, and according to the contents thereof, the CPU 44 controls the auxiliary machines on the side of the slide door, such as a power window and door locking motor, and the various switches and lights up the corresponding indicator 46.

In the following, an action upon the ID code-rewriting mode will be explained. When the communication unit 31 is exchanged due to malfunction, the communication unit 31 after the exchange has its own characteristic ID code that is different from the ID code of the communication unit 31 before the exchange. Therefore, in this case, upon a transmission-allowed condition, an ID terminal in the communication unit 31 after the exchange is controlled from the outside so as to change the control signal for rewriting the ID code from a high level to a low level (for example, zero volts), so that the communication unit 31 becomes in the ID code-rewriting mode.

Upon the ID code-rewriting mode, the transmitting driver 33*c* of the transmitting section 33A of the communication unit 31 receives the control signal for rewriting the ID code having the low level from the CPU 34, so that a transmission output level of the transmitting driver 33*c* is switched to an ID code-rewriting mode level that is larger than a normal communication mode level. Then, only a new ID code that is stored in advance in the internal memory of the communication unit 31 after the exchange is supplied to the modulation circuit 33*a*. The modulation circuit 33*a* on-off modulates the 125 kHz clock pulse as a base signal with the new ID code in a specific short period of time and supplied a modulated wave output to the waveform-shaping filter 33*b*. The coil antenna 17 is driven with the modulated wave output through the transmitting driver 33*c*.

The communication unit 41 is in a transmission-allowed condition and receives the modulated wave transmitted from the coil antenna 17 with the coil antenna 18 by means of electromagnetic induction coupling. As shown in FIG. 23, the modulated wave received by the coil antenna 18 has amplitude that is larger than the amplitude upon a normal communication mode since the transmission output level from the communication unit 31 is large. The modulated wave having this large amplitude is supplied to the receiving section 43*b*, then detected by the detection circuit 43*e* and then, a detected output is supplied to the comparator 43/2 as the first comparator and to the comparator 43/3 as the second comparator in the demodulation circuit 43*f*. The amplitude of the detected output obtained by detecting the modulated wave received upon an ID code-rewriting mode is set larger than the first threshold level of the comparator 43/2 and the second threshold level of the comparator 43/3.

Accordingly, as for the comparator 43/3 in the demodulation circuit 43*f*, the detected output from the detection circuit 43/1 upon outputting from the second threshold level in a comparison between the first and second threshold levels is given priority, then a new ID code is gained and supplied to the CPU 44. The CPU rewrites the former ID code stored in advance in the internal memory with a new ID code supplied from the comparator 43/3.

Then, the communication unit 41 changes its condition from a reception-allowed condition to a transmission-allowed condition. The CPU 44 supplies a signal for notifying completion of the ID code-rewriting as the transmission data Tx to the modulation circuit 43*a*. A modulated wave including the signal for notifying completion of the ID code-rewriting is received by the coil antenna 17 of the communication unit 31 through the waveform-shaping filter 43*b*, the transmitting driver 43*c* and the coil antenna 18.

The modulated wave received by the coil antenna 17 is supplied to the receiving section 33B, then demodulated by the demodulation circuit 33*f*, then the signal for notifying completion of the ID code-rewriting is gained and supplied to the CPU 34. The CPU 34 switches the control signal for rewriting the ID code of the ID terminal from a low level to a high level on the basis of the supplied signal for notifying completion of the ID code-rewriting, so that the ID code-rewriting mode is switched to a normal communication mode.

When the ID code and data are transmitted from the communication unit 41 to the communication unit 31 and when a new ID code is transmitted from the communication unit 41 to the communication unit 31 so as to rewrite the new ID code, an action upon the ID code-rewriting mode can be explained similarly as described above only by changing "transmission" and "reception" with each other.

Figure 22:
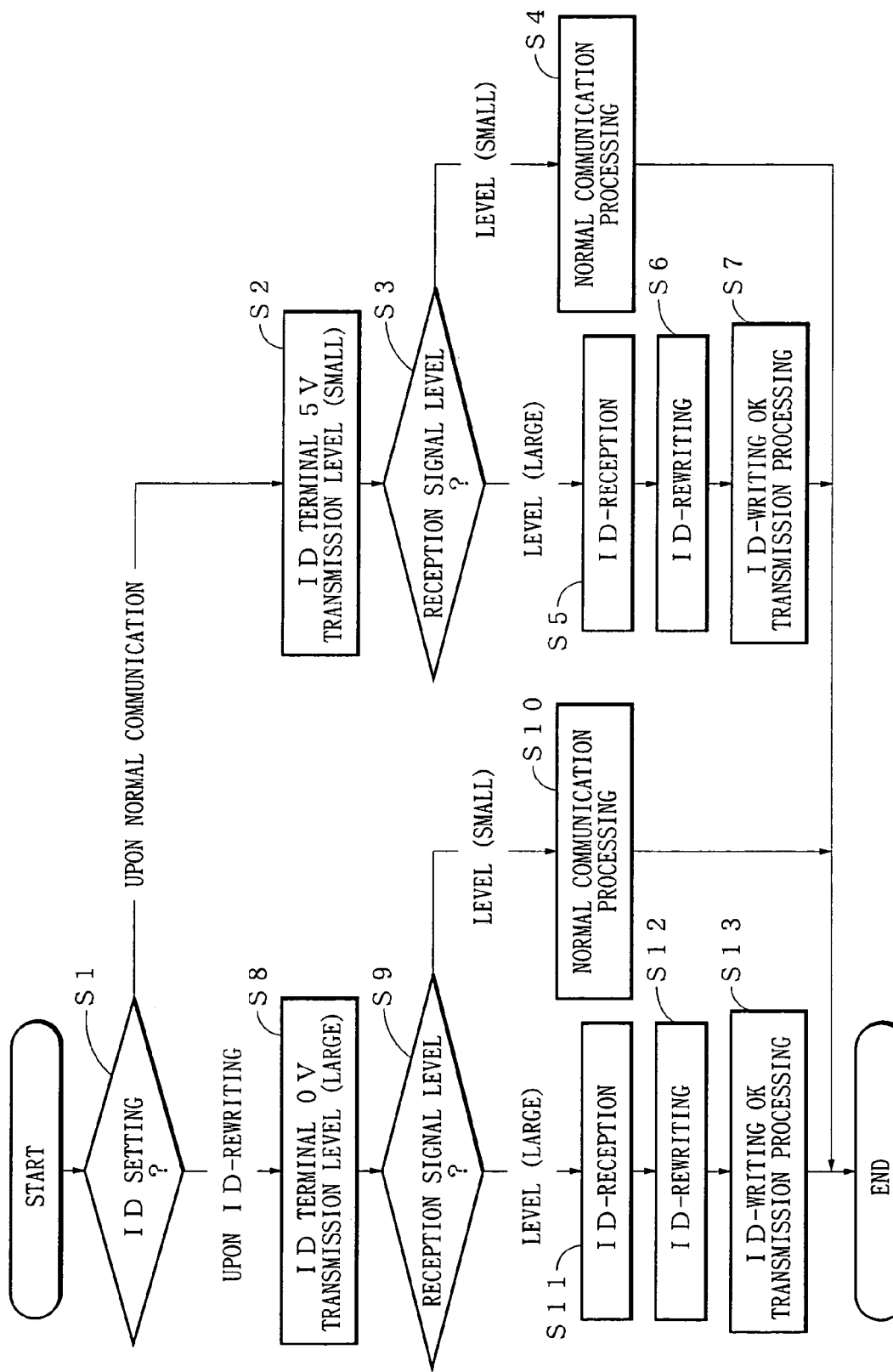
FIG. 22 is a flow chart illustrating processing in the communication unit CPU.

In the following, a processing of the CPU in the communication units 31 and 41 acting as described above will be explained with reference to a flow chart shown in FIG. 22. First, whether the IC code-rewriting mode is set or not is judged (step S1). When the IC code-rewriting mode is not set due to outside control, the system is in a normal communication mode and the level of the control signal for rewriting the ID code of the ID terminal of the CPU 34 (44) is maintained at a high level (5 V) so that the transmission output level of the transmitting driver 33*c* (43*c*) is set to be a normal communication mode level (transmission output level (small)) (step S2).

Then, the CPU 34 (44) judges whether the received signal level received by the coil antenna 17 (18) is large or small (step S3). When the reception level is small, the CPU 34 (44) performs the processing in a normal communication mode (step S4) and thereafter finishes the processing. On the other hand, when the reception level is large, the CPU 34 (44) receives a new ID code (step S5), then rewrites the former ID code stored in advance with the new ID code (step S6), then transmits a signal for notifying completion of the ID code-rewriting (step S7) and then, finishes the processing.

When the IC code-rewriting mode is set at the step S1, the level of the control signal for rewriting the ID code of the ID terminal of the CPU 34 (44) is switched from a high level (5 V) to a low level (0 V) so that the transmission output level of the transmitting driver 33*c* (43*c*) is set to be an ID code-rewriting mode level (transmission output level (large)) (step S8).

Then, the CPU 34 (44) judges whether the received signal level received by the coil antenna 17 (18) is large or small (step S9). When the reception level is small, the CPU 34 (44) performs the processing in a normal communication mode (step S10) and thereafter finishes the processing.

On the other hand, when the reception level is large, the CPU 34 (44) receives a new ID code (step S11), then rewrites the former ID code stored in advance with the new ID code (step S12), then transmits a signal for notifying completion of the ID code-rewriting (step S13) and then, finishes the processing.

As explained above, with the second preferred embodiment of the noncontacting short-range communication device for a slide door according to the present invention, since a security ID code of the semi-duplex bidirectional communication is adopted, therefore the security function works with respect to transmission and reception of data, thereby malfunction due to external field and so on can be avoided. Further, when one communication unit is broken down, there is no need to replace the other normal communication unit. Since the other normal communication unit can be subjected to the rewriting with a new ID code of the replaced communication unit, therefore the maintenance property can be improved and the repair cost can be reduced. Also in the second preferred embodiment, when the bidirectional communication is to be performed between the two communication units, for example, if the reception efficiency of the two communication units becomes unbalance because an impedance of a coil antenna connected to one communication unit is lower than that of a coil antenna connected to another communication unit, likewise in the first preferred embodiment described above, an impedance-adjusting transformer is inserted between the coil antenna and the transmitting and receiving sections of the communication unit that has worse reception efficiency, thereby improving the reception efficiency and taking balance of the reception efficiency of the two communication units.

The aforementioned preferred embodiments are described to aid in understanding the present invention and variations may be made by one skilled in the art without departing from the spirit and scope of the present invention.

For example, in the preferred embodiment described above, a set of the rail and slide part, and a set of the antenna member situated on the side of the vehicle body and the antenna member situated on the side of the slide door are provided. However, instead, a plurality of such sets may be provided.

The structure of the communication units arranged on the side of the vehicle body and on the side of the slide door is not limited to the structure in the preferred embodiment described above and may be another structure.

Further, in the preferred embodiment described above, the impedance-adjusting transformer is inserted in one communication unit. However, instead, the impedance-adjusting transformer may be inserted in both communication units so as to improve the reception efficiency and to take balance of the reception efficiency of the two communication units.

INDUSTRIAL APPLICABILITY

With the construction described in claim 1, transmitting and receiving of the noncontacting data between the sides of the vehicle body and slide door by cheap and simple electromagnetic coupling becomes always possible in a semi-duplex bidirectional communication form. Moreover, since the communication can be attained by using weak outputs, noises can be prevented from being released to the outside and necessary data can be transmitted and received without any interference with the other communication. Furthermore, upon mounting of the device of the present invention, there is no anxiety that the bending of the electric wires might cause the breaking of the electric wires. There is no anxiety that water or dust might cause poor electrical quality, thereby improving the reliability.

With the construction described in claim 2, the reception efficiency can be improved and the reception efficiency of the two communication units can be balanced.

With the construction described in claim 3, transmitting and receiving of the data can be securely performed with low cost.

With the construction described in claim 4, the standby can be possible with low electric power consumption.

With the construction described in claim 5, the on-off modulated data can be securely demodulated.

With the construction described in claim 6, the security function can act with respect to the transmitting and receiving of the data, thereby avoiding malfunction due to the external magnetic field and so on.

With the construction described in claim 7, the reception efficiency can be improved and the reception efficiency of the two communication units can be balanced.

With the construction described in claim 8, since the clock pulse of the microcomputer is used as the base signal in the modulation circuit and there is no need to have a separate circuit for generating the base signal, therefore transmitting and receiving of the data can be securely performed with low cost.

With the construction described in claim 9, the standby can be possible with low electric power consumption.

With the construction described in claim 10, when one communication unit is broken down, there is no need to replace the other normal communication unit. Since the other normal communication unit can be subjected to the rewriting with a new ID code of the replaced communication unit, therefore the maintenance property can be improved and the repair cost can be reduced.

The invention claimed is:

1. A noncontacting short-range communication device for a slide door comprising:
   a rail provided in a vehicle body;
   a slide part provided in a slide door sliding being guided by the rail;
   a first antenna member attached to the rail in the longitudinal direction of the rail;
   a second antenna member provided in the slide part so as to face to the first antenna member closely;
   a first communication unit provided on the side of the vehicle body being connected to the first antenna member; and
   a second communication unit having the same constitution as that of the first communication unit, the second communication unit being provided on the side of the slide door being connected to the second antenna member,
   wherein the first and second communication units transmit or receive data by electromagnetic induction coupling between the first and second antenna members,
   wherein each of the first and second communication units is supplied with electric power from a battery and includes a microcomputer and a data communication circuit controlled by the microcomputer, the data communication circuit performing semi-duplex bidirectional communication,
   wherein the data communication circuit includes:
     a transmitting section, to which a clock pulse of the microcomputer is supplied, for transmitting a modulated wave obtained by on-off modulating the clock pulse as a base signal with the data having a serial communication form through the antenna member; and
     a receiving section for receiving and demodulating the modulated wave through the antenna member so as to gain the data having a serial communication form.

2. The device according to claim 1, wherein at least one of the first and second communication units further includes an impedance-adjusting transformer connected between the antenna member and the transmitting and receiving sections.

3. The device according to claim 1 or 2, wherein the transmitting section includes:
   a modulation circuit, to which a clock pulse of the microcomputer is supplied, for on-off modulating the clock pulse as a base signal with the data having a serial communication form;
   a waveform-shaping filter for waveform-shaping a modulated wave from the modulation circuit; and
   a transmitting driver, to which an output from the waveform-shaping filter is supplied, for driving the antenna member,
   wherein the receiving section includes:
   a tuning circuit connected to the antenna member, for tuning to a clock pulse frequency of the microcomputer; and
   a demodulation circuit for demodulating an output from the tuning circuit so as to gain the data.

4. The device according to claim 3, wherein the transmitting section further includes a control section for rendering the data communication circuit into a low electric power consumption mode on the basis of control by the microcomputer.

5. The device according to claim 3, wherein the demodulation circuit includes:
   a detection circuit for detecting an output from the tuning circuit; and
   a first comparator for comparing a detected output from the detection circuit with a first reference level so as to gain the data.

6. A noncontacting short-range communication device for a slide door comprising:
   a rail provided in a vehicle body;
   a slide part provided in a slide door sliding being guided by the rail;
   a first antenna member attached to the rail in the longitudinal direction of the rail;
   a second antenna member provided in the slide part so as to face to the first antenna member closely;
   a first communication unit provided on the side of the vehicle body being connected to the first antenna member; and
   a second communication unit having the same constitution as that of the first communication unit, the second communication unit being provided on the side of the slide door being connected to the second antenna member,
   wherein the first and second communication units transmit or receive data by electromagnetic induction coupling between the first and second antenna members,
   wherein each of the first and second communication units is supplied with electric power from a battery and includes a microcomputer and a data communication circuit controlled by the microcomputer, the data communication circuit performing semi-duplex bidirectional communication,
   wherein the data communication circuit includes:
     a transmitting section, to which a clock pulse of the microcomputer issupplied, for transmitting a modulated wave obtained by on-off modulating the clock pulse as a base signal with the data having a serial communication form and a security ID code of the semi-duplex bidirectional communication through the antenna member; and
     a receiving section for receiving and demodulating the modulated wave through the antenna member so as to gain the data having a serial communication form and the ID code,
   wherein the microcomputer includes:
     storing means for storing the ID code in advance; and
     collating means for collating the ID code stored in the storing means with the ID code gained by the receiving section.

7. The device according to claim 6, wherein at least one of the first and second communication units further includes an impedance-adjusting transformer connected between the antenna member and the transmitting and receiving sections.

8. The device according to claim 6 or 7, wherein the transmitting section includes:
   a modulation circuit, to which a clock pulse of the microcomputer is supplied, for on-off modulating the clock pulse as a base signal with the data having a serial communication form and the security ID code of the semi-duplex bidirectional communication;

a waveform-shaping filter for waveform-shaping a modulated wave from the modulation circuit; and a transmitting driver, to which an output from the waveform-shaping filter is supplied, for driving the antenna member, wherein the receiving section includes:

a tuning circuit connected to the antenna member, for tuning to a clock pulse frequency of the microcomputer; and a demodulation circuit for demodulating an output from the tuning circuit so as to gain the ID code and the data.

9. The device according to claim 8, wherein the transmitting section further includes a control section for rendering the data communication circuit into a low electric power consumption mode on the basis of control by the microcomputer.

10. The device according to claim 8, wherein the communication unit has a normal communication mode and an ID code-rewriting mode as operation modes thereof, wherein upon the normal communication mode, the modulation circuit is supplied with a clock pulse of the microcomputer and outputs a modulated wave obtained by on-off modulating the clock pulse as a base signal with the data having a serial communication form and the ID code, while upon the ID code-rewriting mode, the modulation circuit is supplied with a clock pulse of the microcomputer and outputs a modulated wave obtained by on-off modulating the clock pulse as a base signal only with the ID code, wherein upon the ID code-rewriting mode, a transmission output level of the transmitting driver is switched from a normal communication mode level to an ID code-rewriting mode level that is larger than the normal communication mode level according to an ID code-rewriting control signal from the microcomputer, and wherein the demodulation circuit includes:

a detection circuit for detecting an output from the tuning circuit;

a first comparator for comparing a detected output from the detection circuit with a first threshold level so as to gain the data; and a second comparator for comparing a detected output from the detection circuit with a second threshold level that is higher than the first threshold level so as to gain the ID code.

* * * * *